(12) United States Patent
Melby et al.

(10) Patent No.: US 6,952,680 B1
(45) Date of Patent: Oct. 4, 2005

(54) APPARATUS AND METHOD FOR TRACKING AND MANAGING PHYSICAL ASSETS

(75) Inventors: John M. Melby, Toledo, OH (US); Andrew F. Suhy, Jr., West New York, NJ (US); Brent C. Parent, Holland, OH (US)

(73) Assignee: Dana Corporation, Toledo, OH (US)

( * ) Notice: Subject to any disclaimer, the term of this patent is extended or adjusted under 35 U.S.C. 154(b) by 81 days.

(21) Appl. No.: 09/702,363

(22) Filed: Oct. 31, 2000

(Under 37 CFR 1.47)

Related U.S. Application Data

(63) Continuation-in-part of application No. 09/653,735, filed on Sep. 1, 2000, which is a continuation-in-part of application No. 09/504,343, filed on Feb. 14, 2000, which is a continuation-in-part of application No. 09/503,671, filed on Feb. 14, 2000, and a continuation-in-part of application No. 09/504,000, filed on Feb. 14, 2000, which is a continuation-in-part of application No. 09/441,289, filed on Nov. 16, 1999.

(60) Provisional application No. 60/166,042, filed on Nov. 17, 1999.

(51) Int. Cl.$^7$ ............................................. G06F 17/60
(52) U.S. Cl. ........................... 705/28; 705/1; 705/7; 705/8; 705/9; 705/10; 705/11; 705/22
(58) Field of Search .................... 705/1, 7, 8, 9, 705/10, 11, 28, 22

(56) References Cited

U.S. PATENT DOCUMENTS

| | | | |
|---|---|---|---|
| 3,581,072 A | 5/1971 | Nymeyer | |
| 3,665,397 A | 5/1972 | Di Napoli et al. | |
| 3,675,204 A | 7/1972 | Miehle et al. | |
| 3,882,305 A | 5/1975 | Johnstone | |
| 4,006,461 A | 2/1977 | Coulter et al. | |

(Continued)

FOREIGN PATENT DOCUMENTS

| EP | 915325 A1 | * 5/1999 | .......... G01G/17/06 |
|---|---|---|---|
| EP | 1 315 112 A2 | 5/2003 | |

(Continued)

OTHER PUBLICATIONS

Fleet Equipment v25n4 p–58–64, Apr. 1999, Carol Birkland.*

(Continued)

*Primary Examiner*—James P. Trammell
*Assistant Examiner*—Calvin Hewitt, II
(74) *Attorney, Agent, or Firm*—Rader, Fishman & Grauer PLLC

(57) ABSTRACT

A computer based system automatically gathers, analyzes, and delivers information relating to the procurement and utilization of a plurality of such assets, such as a fleet of industrial equipment, so as to maximize productivity and to reduce operating costs and administrative burdens. Each of the assets is preferably provided with a data acquisition device for sensing and storing one or more operating characteristics associated therewith. That information can be transmitted through space to a receiver connected to a local controller for storing such information and for transmitting such information to a remote analysis system. The remote analysis system automatically updates individual records associated with each of the assets with the information received. In response to such information, the remote analysis system automatically analyzes the newly provided information and schedules maintenance as required. Information associated with the maintenance is also recorded electronically to maximize efficiency, provide historical trends, automate billing, and control inventory levels.

12 Claims, 9 Drawing Sheets

U.S. PATENT DOCUMENTS

| | | | |
|---|---|---|---|
| 4,009,375 A | | 2/1977 | White et al. |
| 4,041,470 A | | 8/1977 | Slane et al. |
| 4,167,699 A | | 9/1979 | Baker |
| 4,258,421 A | | 3/1981 | Juhasz et al. |
| 4,270,174 A | | 5/1981 | Karlin et al. |
| 4,383,298 A | | 5/1983 | Huff et al. |
| 4,404,639 A | * | 9/1983 | McGuire et al. ............... 701/35 |
| 4,435,769 A | | 3/1984 | Nagano et al. |
| 4,551,719 A | | 11/1985 | Carlin et al. |
| 4,737,910 A | | 4/1988 | Kimbrow |
| 4,799,156 A | | 1/1989 | Shavit et al. |
| 4,946,169 A | | 8/1990 | Hofmann |
| 5,058,044 A | | 10/1991 | Stewart et al. |
| 5,091,713 A | | 2/1992 | Horne et al. |
| 5,153,825 A | | 10/1992 | Yauk et al. |
| 5,168,445 A | * | 12/1992 | Kawashima et al. .......... 705/10 |
| 5,216,612 A | * | 6/1993 | Cornett et al. ................ 700/96 |
| 5,243,515 A | | 9/1993 | Lee |
| 5,267,147 A | | 11/1993 | Harshaw et al. |
| 5,319,544 A | | 6/1994 | Schmerer et al. |
| 5,329,444 A | | 7/1994 | Takahashi et al. |
| 5,386,362 A | | 1/1995 | Keret |
| 5,450,317 A | * | 9/1995 | Lu et al. ....................... 705/10 |
| 5,510,978 A | | 4/1996 | Colgan |
| 5,590,057 A | | 12/1996 | Fletcher et al. |
| 5,608,643 A | | 3/1997 | Wichter et al. |
| 5,664,113 A | | 9/1997 | Worger et al. |
| 5,682,142 A | | 10/1997 | Loosmore et al. |
| 5,721,678 A | | 2/1998 | Widl |
| 5,732,401 A | | 3/1998 | Conway |
| 5,737,215 A | | 4/1998 | Schricker et al. |
| 5,757,643 A | | 5/1998 | Kuroda et al. |
| 5,774,873 A | | 6/1998 | Berent et al. |
| 5,778,345 A | | 7/1998 | McCartney |
| 5,788,504 A | | 8/1998 | Rice et al. |
| 5,797,107 A | | 8/1998 | Berg et al. |
| 5,799,286 A | | 8/1998 | Morgan et al. |
| 5,802,500 A | | 9/1998 | Ryan et al. |
| 5,812,070 A | | 9/1998 | Tagami et al. |
| 5,826,240 A | | 10/1998 | Brockman et al. |
| 5,832,069 A | | 11/1998 | Waters et al. |
| 5,835,897 A | | 11/1998 | Dang |
| 5,842,212 A | | 11/1998 | Ballurio et al. |
| 5,848,426 A | | 12/1998 | Wang et al. |
| 5,856,931 A | * | 1/1999 | McCasland ................ 702/182 |
| 5,875,430 A | * | 2/1999 | Koether ......................... 705/1 |
| 5,875,431 A | | 2/1999 | Heckman et al. |
| 5,890,138 A | | 3/1999 | Godin et al. |
| 5,895,906 A | | 4/1999 | Danielson et al. |
| 5,904,727 A | | 5/1999 | Prabhakaran |
| 5,910,802 A | | 6/1999 | Shields et al. |
| 5,922,040 A | | 7/1999 | Prabhakaran |
| 5,926,799 A | | 7/1999 | Robinson |
| 5,934,439 A | | 8/1999 | Kanoh et al. |
| 5,940,807 A | | 8/1999 | Purcell |
| 5,943,676 A | | 8/1999 | Boothby |
| 5,946,662 A | | 8/1999 | Ettl et al. |
| 5,950,173 A | | 9/1999 | Perkowski |
| 5,953,707 A | | 9/1999 | Huang et al. |
| 5,959,577 A | | 9/1999 | Fan et al. |
| 5,963,910 A | | 10/1999 | Ulwick |
| 5,965,858 A | | 10/1999 | Suzuki et al. |
| 5,970,436 A | | 10/1999 | Berg et al. |
| 5,983,198 A | | 11/1999 | Mowery et al. |
| 5,991,741 A | | 11/1999 | Speakman et al. |
| 5,995,947 A | | 11/1999 | Fraser et al. |
| 6,003,808 A | * | 12/1999 | Nguyen et al. ............. 244/1 R |
| 6,006,201 A | | 12/1999 | Berent et al. |
| 6,012,045 A | | 1/2000 | Barzilai et al. |
| 6,014,644 A | | 1/2000 | Erickson |
| 6,024,641 A | | 2/2000 | Sarno |
| 6,026,383 A | | 2/2000 | Ausubel |
| 6,052,450 A | | 4/2000 | Allison et al. |
| 6,067,525 A | | 5/2000 | Johnson et al. |
| 6,081,789 A | | 6/2000 | Purcell |
| 6,101,433 A | | 8/2000 | Flicker, Jr. |
| 6,112,206 A | | 8/2000 | Morris et al. |
| 6,115,691 A | | 9/2000 | Ulwick |
| 6,141,629 A | * | 10/2000 | Yamamoto et al. ......... 702/187 |
| 6,148,293 A | | 11/2000 | King |
| 6,157,808 A | | 12/2000 | Hollingsworth |
| 6,161,099 A | | 12/2000 | Harrington et al. |
| 6,199,050 B1 | | 3/2001 | Alaia et al. |
| 6,208,853 B1 | | 3/2001 | LoVasco et al. |
| 6,227,862 B1 | | 5/2001 | Harkness |
| 6,230,081 B1 | | 5/2001 | Albertshofer |
| 6,249,775 B1 | | 6/2001 | Freeman et al. |
| 6,259,959 B1 | | 7/2001 | Martin |
| 6,347,302 B1 | | 2/2002 | Joao |
| 6,356,437 B1 | * | 3/2002 | Mitchell et al. ............ 361/683 |
| 6,366,220 B1 | | 4/2002 | Elliott |
| 6,411,922 B1 | | 6/2002 | Clark et al. |
| 6,415,269 B1 | | 7/2002 | Dinwoodie |
| 6,453,298 B2 | | 9/2002 | Murakami et al. |
| 6,502,080 B1 | | 12/2002 | Eichorst et al. |

FOREIGN PATENT DOCUMENTS

| | | |
|---|---|---|
| GB | 2 308 947 | 7/1997 |
| WO | WO-97/017683 A1 | 5/1997 |
| WO | WO-01/037118 A2 | 5/2001 |
| WO | WO-01/037121 A2 | 5/2001 |
| WO | WO-03/042891 A1 | 5/2003 |

OTHER PUBLICATIONS

Print Out of information from the website of Intermec.com at http://corp.intermec.com.

Pocket PC features from http://www.microsft.com/mobile/pocketpc/features/default.asp.

Club Wedd at http://target.com/registries/club_wedd/.

Bar Code Inventory Control Module at http://www.sssonline.com/bcforklt.asp.

Intermec Batch Portable Data Collection Terminals at http://www.markingtech.com.

Handheld Products Dolphin RF at http://www.barcode-scanners.com/hhdolrf.htm.

Brochure entitled "dolphin hand held computer".

Affinity Publishing's Software and Resource Guide for the Palm Computing Platform; Software, Peripherals & Accessories, vol. 9, Copyright 1999.

Auto TradeCenter.Com printed from http://www.autotradecenter.com/new_trade_home.html on Jan. 27, 2000.

Becker, "Analysis and Modeling of a Fleet Management System of an Airport Shuttle Service," 9/1999.

Bill Miller Equipment Sales, Inc., Rental Fleet, printed from http://bmillerequipmentsales.com/rental.html on Jan. 21, 2000.

bLiquid printed from http://bliquid.com/osauction.stm on Nov. 24, 1999.

Business Recorder, "Sindh Cabinet Okays Agro–Forestry Policy 1998," Aug. 23, 1998.

Business Wire, "Vacation Harber Becomes the Newest Member of the Fairmarket Auction Network," Nov. 2, 1999 printed from http://www.findarticles.com/cf_dls.m0EIN/1999_Nov_2/57101935/print.jhtml on Apr. 7, 2004.

Canadian Trucking Human Resources Council, "Driver Training: Setting the Stage for the Next Century," printed from http://www.cthrc.com/english/media/092299.html on Jul. 17, 2000.

CARS+rental Fleet Control Release 10.5B printed from http://services.software–directory.../491.CARS.Rental.Fleet.Control.System.Release.105B on Jan. 21, 2000.

Caterpillar Lift Trucks—Fleet Management printed from http://www.cat–lift.com/fleet.html on Nov. 24, 1999.

Caterpillar, Inc., "The Cat Rental Store." printed from http://www.caterpillar.com/services/rental/rental.html on Jan. 30, 2000.

Clark—Finance Options printed from http:\\www.clarkmhc.com/DealerFinance.html on Nov. 24, 1999.

Consolidated Services Archives printed from http://www.consolidatedservices.com/html/archives.html on Nov. 24, 1999.

Construction Industry Manufacturers Association, Construction Equipment Monitoring and Tracking printed from http://www.cimanet.com/public/ts–overview.shtml on Nov. 24, 1999.

Cyberdyne Incorporated printed from http://www.industry-group.com on Nov. 24, 1999.

Daewoo Securities Co., Ltd.—Finance & Services Division printed from http://www.daewoo.com/finance.html on Nov. 24, 1999.

Deierlein, Bob, "New Lease on Truck Life: Automated maintenance," Beverage World, v113n566, pp: 138; May 1994.

DirectAg.com—Company info–<Who We Are printed from http://www.directag.com/directag/companyinfo/content/1,1005,2–91,00.html on Nov. 24, 1999.

Driver Certification printed from http://www.resa.net/computer_services/trans/drivcert.htm on Jul. 17, 2000.

ePlus printed from http://www.eplusonline.com/srvc_suite.htm on Nov. 24, 1999.

Euro Iq Pte Ltd.—Complete RFID Applications and Solutions printed from http://www.euroiqu.com.sg/rfid3.htm on Jul. 17, 2000.

ExtraFleet v1.6 printed from http://www.currsoft.com/products.htm on Jul. 17, 2000.

Forbes, Bruce Kenneth, "Mastering the Web: Extending the CIFM Enterprise Solution to the World Wide Web," printed from http://www.fmlink.com.au/images.ua/Papers/WW2.htm on Jul. 17, 2001.

Ford Credit: Motor Vehicle Lease Agreement printed from http://www.fordcredit.com/redcarpetlease/rclpage1.html on Jun. 1, 2000.

Forklift Exchange, Inc. printed from http://www.forkliftexchange.com/main.htm on Nov. 24, 1999.

Frank's Supply Company—Rental Fork Lifts printed from http://franks–supply.com/ren_frlf.htm on Jun. 1, 2000.

Freight–Link by CSC Safety Modules printed from http://www.csclink.com/safety.htm on Jul. 17, 2000.

GE Capital Fleet Services—eFleet—The Interactive Fleet Reporting Solution printed from http://www.ge–capital–fleet–services.co.uk/customer/efleet.htm on May 19, 2002.

GE Capital Fleet Services—Fleet Management Solutions printed from http://gecapital.com/fleet/small_fleet/sfs_fms.htm on Nov. 24, 1999.

Global Machinery Information Service (GMIS) printed from http://www.gmis.com/consult.html on Nov. 24, 1999.

Good Used Stuff printed from http://www.goodusedstuff.com (2 pages).

Good Used Stuff printed from http://www.goodusedstuff.com on Nov. 24, 1999 (2 pages).

Harris & Associates—Listening to you, with qualified staff, committed to your success printed from http://www.harris–assoc.com on Nov. 24, 1999.

Hyster Services: Fleet Services printed from http://www.hysterusa.com/services/fleet.ace printed on Nov. 24, 2000.

I.D. Systems Inc.—Software Video Presentation printed from http://www.id–systems.com/software.html on Jul. 17, 2000.

I.D. Systems, Inc. printed from http://www.id–systems.com on Nov. 24, 1999.

I.D. Systems, Inc.; Brochure including articles date Oct. 1998, and May 31, 1998.

iMark.com–How iMark.com Works printed from http://www.imark.com/about_works.asp on Feb. 6, 2000.

Industrial Truck Association printed from http://www.indtrk.org/home.htm on Nov. 24, 1999.

Industryresearch.net printed from http://search.slwebsite.com/dealersforum/df.asp?Page=buylist on Nov. 24, 1999.

Infinite quanta, inc. printed from http://www.iquanta.com/fltover.htm on Jul. 17, 2000.

Integrated Vehicle Systems, Inc. printed from http://www.fleetfix.com/home.htm on Nov. 24, 1999.

Intrupa Manufacturing Company printed from http://www.intrupa.com/home1.html on Nov. 24, 1999.

Just in Time for Your Summer Vacation: Online Bidding for Car Rental at Budget Rent A Car from PR Newswire dated Jun. 2, 1999.

Kalmar AC printed from http://www.kalmarac.com/kal–chi_usedtrucks.html on Nov. 24, 1999.

Kingsley Associates—Research–based Consulting for the Real Estate Industry printed from http://www.kinsleyassoc.com/CustServ.html on Jul. 17, 2001.

Komatsu Ltd.—Global Navigator printed from http://www.komatsu.com on Nov. 24, 1999.

Linde AG printed from http://www.linde–forklifts.com on May 18, 2002.

Martin, Tom, "Get the Lease with the Most: A Little Goes a Long Way," Jun. 3, 1991, Computer World, vol. 25, No. 22, pp. 107–109.

Material Handling Industry of America printed from http://www.mhia.org on Nov. 24, 1999.

MHEDA Journal Online: Fall 1998, "Western Carolina Forklift Keeps Watch" printed from http://www.datakey.org/mhedajournal/4Q98_articles/Member Profile.html on Nov. 24, 1999.

MHEDA Journal Online: Fall 1999, "Sales Success Stories" printed from http://www.datakey.org/mhedajournal/4Q99_Articles/Success.html on Nov. 24, 1999.

MHEDA Journal Online: Spring 1999 "Remote Equipment Systems, Inc." printed from http://www.datakey.org/mhedajournal/2Q99_articles/fair.html on Nov. 24, 1999.

MHEDA Journal Online: Spring 1999, "Ask Yor Board," printed from http://www.datakey.org/mhedajournal/2Q99_articles/askBoard.html on Nov. 24, 1999.

MHEDA Journal Online: Winter 1999, "SXI Technologies" printed from http://www.datakey.org/mhedajournal/1Q99_articles/promat.html on Nov. 24, 1999.

Minecom, "Tracking: Personnel and Vehicle Tracking," printed from http://www.minecom.com/autotracking.shtml on Jul. 17, 2001.

Mitsubishi Forklift Trucks, "Fleet Management," printd from http://www.mit–lift.com/standard/fleetl.html on Nov. 24, 1999.

Omni Fleet, "Internet Enabled Fleet Maintenance Software," printed from http://www.omnifleet.com/product_info/matrix.html on Jul. 17, 2001.

OpenSite Technologies, Inc. printed from http://www.opensite.com on Nov. 24, 1999.

Pathlore, "Pathlore Learning Management System," printed from http://www.pathlore.com/products_services.lms.html on Jul. 17, 2001.

PHH Vehicle Management Services printed from http://www.phh.com/vmshome.htm on Nov. 24, 1999.

Pratt & Whitney Canada, "Repair & Overhaul: Eagle Service Plan," printed from http://www.pwc.ca/en_repair/esp_rate.html on Jun. 1, 2000.

Puma Technology, Inc., "Satellite Forms Enterprise Edition: Enabling Enterprise Solutions for Palm Computing Handhelds," printed from http://www.pumatech.com/satforms_ee.html on Jun. 2, 2000.

Raymond Leasing Corporation printed from http://www.raymondcorp.com/pages/leasing.html on Nov. 24, 1999.

Remote Equipment Systems, Inc., "UDL Fleet Management System."

Rental Equipment Register printed from http://www.rermag.com/page.html on Nov. 24, 1999.

Rentalift printed from http://www.rentalift.com on Jan. 21, 2000.

Ritchie Bros. Auctioneers printed from http://www.rbauction.com/ on Nov. 24, 1999.

Royal Tractor, "Manufacturers of Mobile Equipment for Industrial Materials Handling," printed from http://www.royaltracotr.com on Nov. 24, 1999.

Sager, Ira, "The Great Equalizer," Business Week, May 18, 1994 printed from wysiwyg://19http://www.businessweek.com/1998/35/z3372007.htm on May 14, 2002.

Salex Corporation, "Replacement Forecast," printed from http://www.salex.com/response/sales.htm on Nov. 24, 1999.

Salex, "Salex & American Express Introduce: FleetExpressLink," printed from http://www.salex.com/home.htm on Nov. 24, 1999.

Swedish, Julian A., "Simulation of an Inland Waterway Barge Fleet Distribution Network," Proceedings of the 1998 Winter Simulation Conference.

SXI Technologies; UDL Fleet Management System (Undated).

Systems Material Handling—Credit & Financing printed from http://www.smhco.com/credit.htm on Nov. 24, 1999.

Toyota Industrial Equipment printed from http://www.toyotaforklift.com/company_profile/company.html on Nov. 24, 1999.

Transdat.G.M.I.S. Global Equipment/Trucks Database printed from http://www.transdat.com.au/list.asp on Nov. 24, 1999.

U–Reca printed from http://210.253.190.250/index.html on Nov. 24, 1999.

Webster's Ninth New Collegiate Dictionary; Copyright 1994, p. 637.

Yale Fleet Management, "Reduce Overall Operating Costs a Minimum of 25%," printed from http://www.yale.com/services/fltmgmt.html on Nov. 24, 1999.

* cited by examiner

APPARATUS AND METHOD FOR TRACKING AND MANAGING PHYSICAL ASSETS

RELATED APPLICATIONS

This application is a continuation-in-part and claims the benefit of U.S. application Ser. No. 09/441,289 filed Nov. 16, 1999, U.S. Provisional Application Ser. No. 60/166,042 filed Nov. 17, 1999, U.S. application Ser. No. 09/503,671 filed Feb. 14, 2000, U.S. application Ser. No. 09/504,000 filed Feb. 14, 2000, U.S. application Ser. No. 09/504,343 filed Feb. 14, 2000, and U.S. application Ser. No. 09/653,735 filed Sep. 1, 2000, the contents of which are all hereby incorporated in their entirety by reference.

BACKGROUND OF THE INVENTION

The present invention relates in general to systems for tracking and managing physical assets to promote the efficient maintenance of the assets while reducing cost. In particular, this invention relates to a computer based system for automatically gathering, analyzing, and delivering information relating to the maintenance of a plurality of such assets, such as a fleet of industrial equipment, so as to maximize productivity and to reduce the operating costs and administrative burdens associated with such assets.

Many businesses operate a plurality of physical assets to assist in the performance of the daily activities that are required to produce goods or services. For example, a typical manufacturer of goods often uses a fleet of industrial equipment, such as forklifts, conveyors, machine tools, and the like, in its daily operations to facilitate the manufacture of goods for its customers. In a similar manner, a typical provider of services also often employs a plurality of assets, such as computers, communications equipment, photo imaging equipment, and the like, in its daily operations to facilitate the performance of services for its customers. Traditionally, businesses have purchased such assets for use in their facilities and have employed staff to operate and maintain the assets in furtherance of the manufacture of goods or the performance of services.

Regardless of the specific nature of the business, the operation of these assets has usually been considered to be somewhat ancillary to the core nature of the business. In other words, although the use of these assets is helpful (indeed, sometimes necessary) for the business to manufacture the goods or provide the services in a cost efficient manner, the ownership, operation, and maintenance of such assets is not, of itself, a core function of the business. Consequently, the costs associated with the procurement and utilization of such assets have not been traditionally monitored or analyzed by the business in great detail. Rather, such costs have usually been considered to be relatively fixed costs of doing business, and any management of such assets has been performed, if at all, by relatively low level employees having little training or inclination to increase productivity and reduce costs.

Obviously, many businesses have been able to produce goods and provide services without actively managing the costs of obtaining and operating these assets. However, optimization of productivity and minimization of costs are key considerations in the modern business environment. Thus, it would be desirable to provide a computer based system for automatically gathering, analyzing, and delivering information relating to the procurement and utilization of a plurality of such assets, such as a fleet of industrial equipment, so as to maximize productivity and to reduce operating costs and administrative burdens associated with such assets.

It would also be desirable to be able to provide different parties having an interest in the asset ready access to up-to-date real-time and historical access to the information associated with asset usage, maintenance, performance, and the like. For example, besides the business using the asset, there is often a third party maintenance organization that helps to maintain the asset and a leasing company acting as the true asset owner that leases the asset to the business. Because the leasing company lacks appropriate information concerning the asset, the leasing arrangement typically takes this lack of information into account as part of the lease transaction, often through a combination of both a fixed lease amount tied to the asset regardless of use, as well as a financial cushion for the benefit of the true asset owner to cover unforeseen problems associated with the asset including over-use and improper maintenance.

It is known to record and store operational parameters or fault codes associated with the asset, which may be transmitted using a communications network to a central location for the purpose of undertaking diagnostics. It is also known to use handheld devices for the real-time sharing of information with a central system. The handheld device can access information from the central system such as the status of available inventory. The central system can also provider instructions to a user of the handheld device. Finally, it is known to use various electronic systems for monitoring inventory.

However, if each of the entities involved with an asset had ready access to the same information concerning the asset, and the ability to update that information as well as related information associated with maintenance of the asset on a real-time basis, the involved parties may be willing to share an increased portion of the financial risk/reward associated with the usage, maintenance, performance, or the like with respect to the asset. With appropriate objective information it may be possible to distribute a portion of the responsibility to other responsible third parties including the asset manufacturer or supplier, and asset maintenance organization.

SUMMARY OF THE INVENTION

This invention relates to a computer based system for automatically gathering, analyzing, and delivering information relating to the procurement and utilization of a plurality of such assets, such as a fleet of industrial equipment, so as to maximize productivity and to reduce operating costs and administrative burdens. Each of the assets is preferably provided with a data acquisition device for sensing and storing one or more operating characteristics associated therewith such as a fault code generated by the asset when there is a maintenance problem or when routine maintenance is required in accordance with predetermined criteria. That information can be transmitted through space to a receiver connected to a local controller for storing such information and for transmitting such information over the Internet to a remote analysis system. The remote analysis system automatically updates individual records associated with each of the assets with the information received from the Internet. In response to such information, the remote analysis system automatically analyzes the newly provided information and generates reports regarding scheduled maintenance, warranty coverage, and other management information. These reports can be transmitted back over the Internet to an administrative controller for review by one or more persons responsible for managerial review. Additionally or alternatively, the remote analysis system can automatically post such reports on a website and, thus, be made available to one or more of such persons upon request.

Not only can the information be provided to an administrative controller, but it can be provided to third parties such as maintenance organizations, asset manufacturers or suppliers, and leasing companies. By providing up-to-date real-time and historical information concerning the asset, such third parties are willing to share the risk of the asset's usage, maintenance, and performance through creative arrangements with the asset user. A maintenance organization, for example, may be willing to enter into a fixed maintenance contract when it has the ability to readily detect adverse maintenance trends regarding an asset and is given the ability to take pro-active steps to address problems before they become major. The cost-savings associated with such a pro-active approach by an expert may be shared to the benefit of the business and the maintenance organization. Similarly, a leasing company that can reduce ownership risk through asset monitoring and appropriate asset utilization is more likely to agree to a hybrid minimum term payment and asset usage billing system or even a usage based billing system with no minimum payments.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
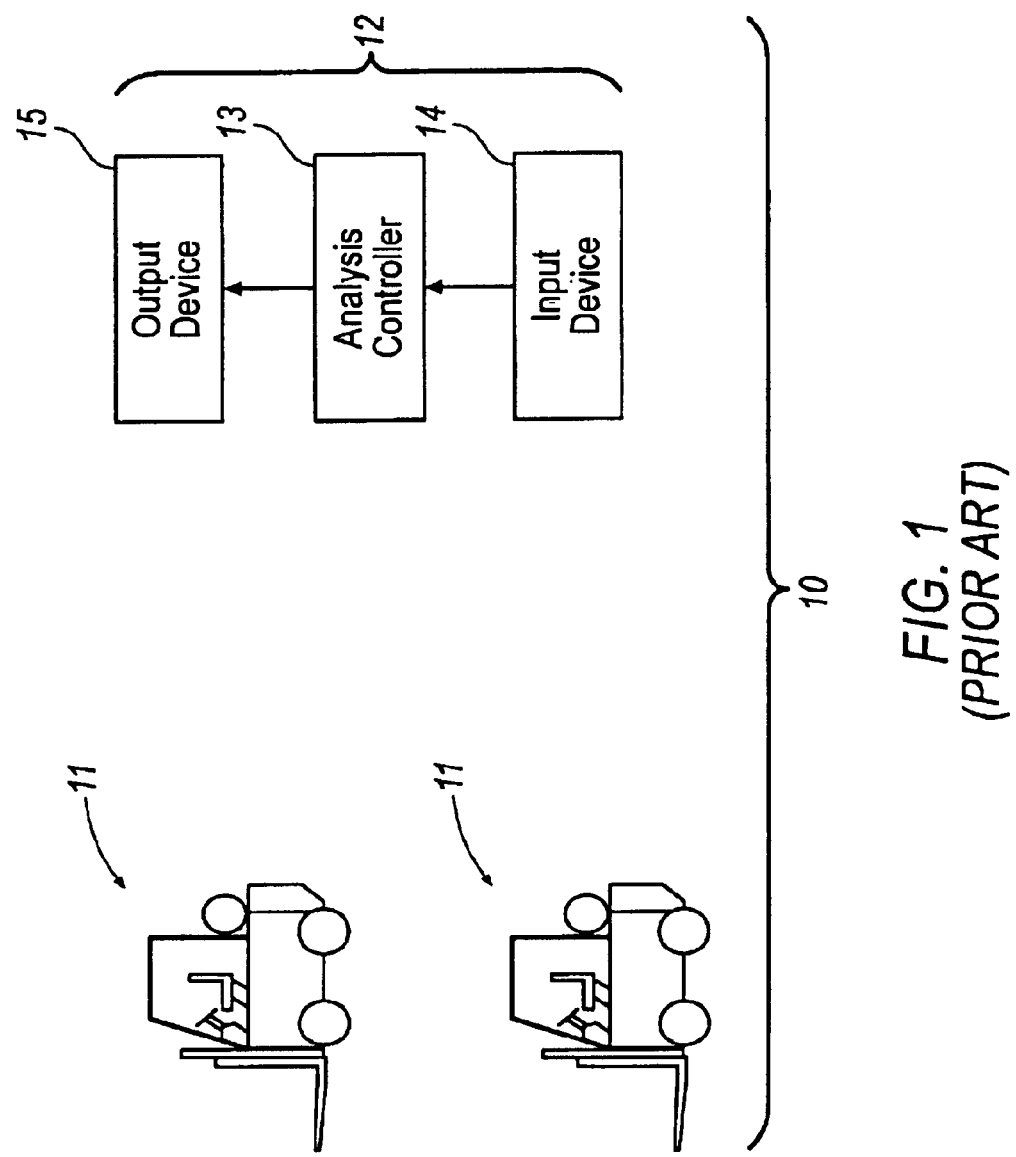
FIG. 1 is a schematic block diagram of a prior art computer based system for tracking and managing a plurality of assets.

Referring now to the drawings, there is illustrated in FIG. 1 a schematic block diagram of a prior art computer based system, indicated generally at 10, for tracking and managing a plurality of assets, several of which are indicated generally at 11. The assets 11 are illustrated as being a plurality of pieces of movable industrial equipment, such as a plurality of conventional forklifts or similar machinery, used in the manufacture of goods in a typical factory environment. However, the prior art method could be used to track and manage any type of asset 11, such as those described above, used in the manufacture of goods or the performance of services. The basic structure and operation of each of the forklifts 11 are well known in the art and, therefore, require no discussion for a complete understanding of this invention.

The prior art system 10 further included a remote analysis system, indicated generally at 12, for tracking and managing the assets 11. The remote analysis system 12 was completely separate and apart from the assets 11 and included an analysis controller 13 having one or more input devices 14 and one or more output devices 15 connected thereto. The remote analysis system 12 could be embodied as any conventional electronic controller, such as a microprocessor-based computer device. The input device 14 was embodied as a keyboard or other conventional mechanism for manually inputting data in electronic form to the analysis controller 13 for processing in the manner described below. The output device 15 was embodied as a printer or other conventional mechanism for generating a hard copy of the management information generated by the analysis controller 13 in the manner described below.

Figure 2:
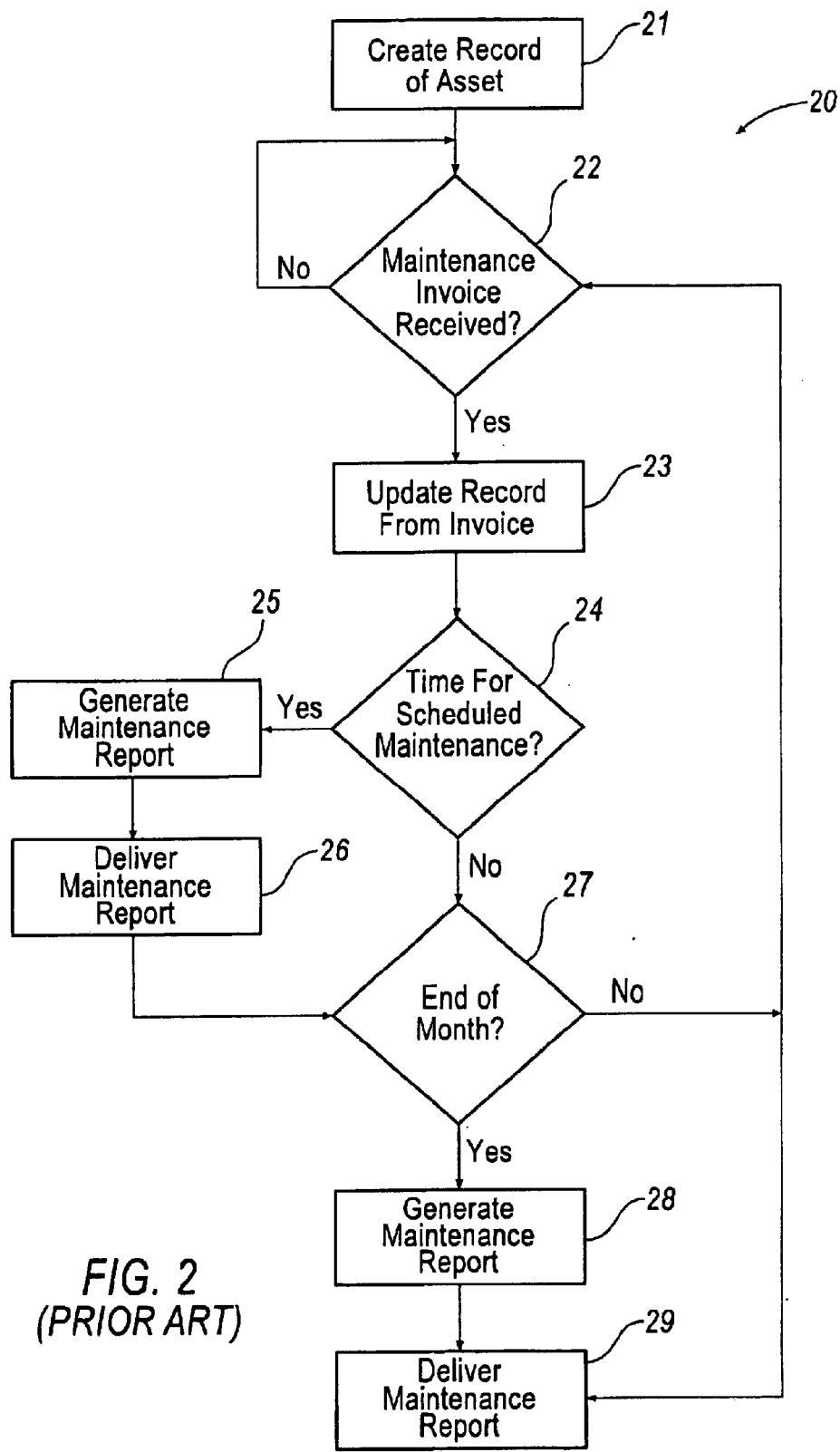
FIG. 2 is a flow chart of a prior art method for tracking and managing assets in accordance with the prior art computer based system illustrated in FIG. 1.

Referring now to FIG. 2, there is illustrated a flow chart, indicated generally at 20, of a prior art method for tracking and managing the assets 11 in accordance with the prior art computer based system 10 illustrated in FIG. 1. Throughout this discussion, reference will be made to a first person or entity that owns or operates the assets 11 that are being tracked and to a second person or entity that is responsible for tracking the management information relating to such assets 11. Notwithstanding this, it will be appreciated that a single person or entity may not only own and operate the assets 11, but also track the management information relating thereto.

In an initial step 21 of the prior art method 20, a record was created for each individual asset 11 by the person or entity responsible for tracking such assets, such as one of the forklifts 11 illustrated in FIG. 1. This record was created electronically within the analysis controller 13 by means of the input device 14 and included a variety of information that was desired to be tracked for management purposes. First, the record included information that uniquely identified the particular asset 11 being tracked. Such identification information included, for example, data regarding the make, model, year, and serial number of the asset 11, plus any customer-assigned identification number. Second, the record included information that related to the operational characteristics of the particular asset 11 being tracked, such as the physical requirements or limitations of the asset 11 (mast height, load capacity, type of tires for the forklift 11, for example), the type of fuel used, and the period of time or usage between the performance of periodic maintenance. Third, the record included information relating to the acquisition of the asset 11 by the owner or lessee thereof. Such acquisition information included, for example, the type and date of acquisition (purchase or lease, for example), the name of the owner or lessee, the location at which the asset 11 is used, the expected amount of usage of the asset 11 (one, two, or three shifts, for example), and the cost of the acquisition or lease. Furthermore, the record included an area for adding additional information or remarks as desired.

In a second step 22 of the prior art method 20, it was determined whether a maintenance invoice had been received by the person or entity responsible for tracking the assets 11. Typically, a maintenance invoice was a written communication that was generated created by or at the request of the person or entity that owned or operated the assets 11. The maintenance invoice was usually generated upon the occurrence of an event relating to the particular asset 11 and generally contained information regarding the status of one or more operational characteristics of that asset 11. For example, after a particular forklift 11 had been operated by the person or entity that owned or operated the asset 11 for a particular period of time, it would require the performance of some maintenance. This maintenance may, for example, have constituted routine preventative service as a result of the elapse of a predetermined period of time or usage. Alternatively, such maintenance may have constituted non-routine service, such as a repair of a mechanical breakdown. In either event, a maintenance invoice was generated as a result of the performance of that maintenance. The occurrence of other events related to the assets 11 could also result in the generation of maintenance invoices. In many cases, the maintenance was performed by a maintenance organization having specialized knowledge of asset 11 and its long-term care.

Regardless of the nature of the event that caused them to be generated, the maintenance invoices were generated in hard copy form and contained therein certain information that was desired to be tracked for management purposes, such as the date and nature of the maintenance that was performed, the amount of usage of the asset 11 as of the date of such maintenance, and the cost of such maintenance. To perform the second step 22 of the prior art method 20, the maintenance invoices were required to be physically delivered from the location where the assets 11 were being used or serviced to the location of the analysis controller 13 or to the location of the input device 14 of the analysis controller 13. By physically delivered, it is meant that the maintenance invoice was transmitted in a non-electronic, hard copy form (including, for example, by facsimile) from the person or entity that owned or operated the asset 11 (and who performed, or had performed, the maintenance on the asset 11) to the person or entity responsible for tracking the assets 11.

As shown in FIG. 2, the prior art method 20 continuously repeated step 22 until it was determined that a maintenance invoice had been received by the person or entity responsible for tracking the assets 11. When that occurred, the prior art method branched from the step 22 to a step 23, wherein the record contained in the analysis controller 13 relating to the particular asset 11 was updated with the information contained in the maintenance invoice. This step 23 was accomplished by utilizing the input device 14 to manually enter the information contained in the maintenance invoice into the record relating to the particular asset 11 contained in the analysis controller 13.

Based upon the updated information contained in the record of the asset 11, the analysis controller 13 was programmed to perform a fourth step 24 of the prior art method 20, wherein it was determined whether a sufficient period of time or usage had elapsed as to trigger the performance of periodic routine maintenance for that asset 11. Typically, such determination was made by determining the amount of the elapsed time or usage of the asset 11 (by comparing the most recent indication of the date or amount of usage of the asset 11 with the previous date or amount of usage contained in the record stored in the analysis controller 13), and by comparing such elapsed time or amount of usage with a predetermined standard (also contained in the record of the asset 11 stored in the analysis controller 13). If it was determined that a sufficient amount of elapsed time or amount of usage had occurred, the method 20 branched from the step 24 to a step 25, wherein a hard copy maintenance report was generated by the output device 15. Then, in step 26 of the prior art method 20, the maintenance report generated in the step 25 was physically delivered from the person or entity responsible for tracking the asset 11 to the person or entity that owned or operated the asset 11. The maintenance report advised the person or entity that owned or operated the asset 11 that the time had arrived for the performance of periodic routine maintenance.

Thereafter, the prior art method 20 entered a step 27, wherein it was determined whether a predetermined period of time had elapsed to generate a periodic management report covering some or all of the assets 11 being tracked. Alternatively, if in step 24 of the prior art method 20, it was determined that a sufficient amount elapsed time or amount of usage had not yet occurred, the method 20 branched directly from the step 24 to the step 27. In either event, such management reports were typically generated on a monthly basis. Thus, if the end of the month had occurred, the prior art method 20 branched from the step 27 to a step 28 wherein a hard copy management report was generated by the output device 15. Then, in step 29 of the prior art method 20, the management report generated in the step 28 was physically delivered from the person or entity responsible for tracking the asset 11 to the person or entity that owned or operated the asset 11 The management report advised the person or entity that owned or operated the asset 11 of the status of some or all of the assets 11 that were being tracked, allowing various management oversight and decisions to be made at that time. Thereafter, the prior art method 20 returned from the step 29 to the step 22, wherein it was determined whether a maintenance invoice had been created by or at the request of the person or entity that owns or operates the assets 11 and was physically delivered to the person or entity responsible for tracking the assets 11. Alternatively, if in step 27 of the prior art method 20, it was determined that a predetermined period of time had not yet elapsed to generate a periodic management report covering some or all of the assets 11 being tracked, then the method 20 returned directly from the step 27 to the step 22.

Figure 3:
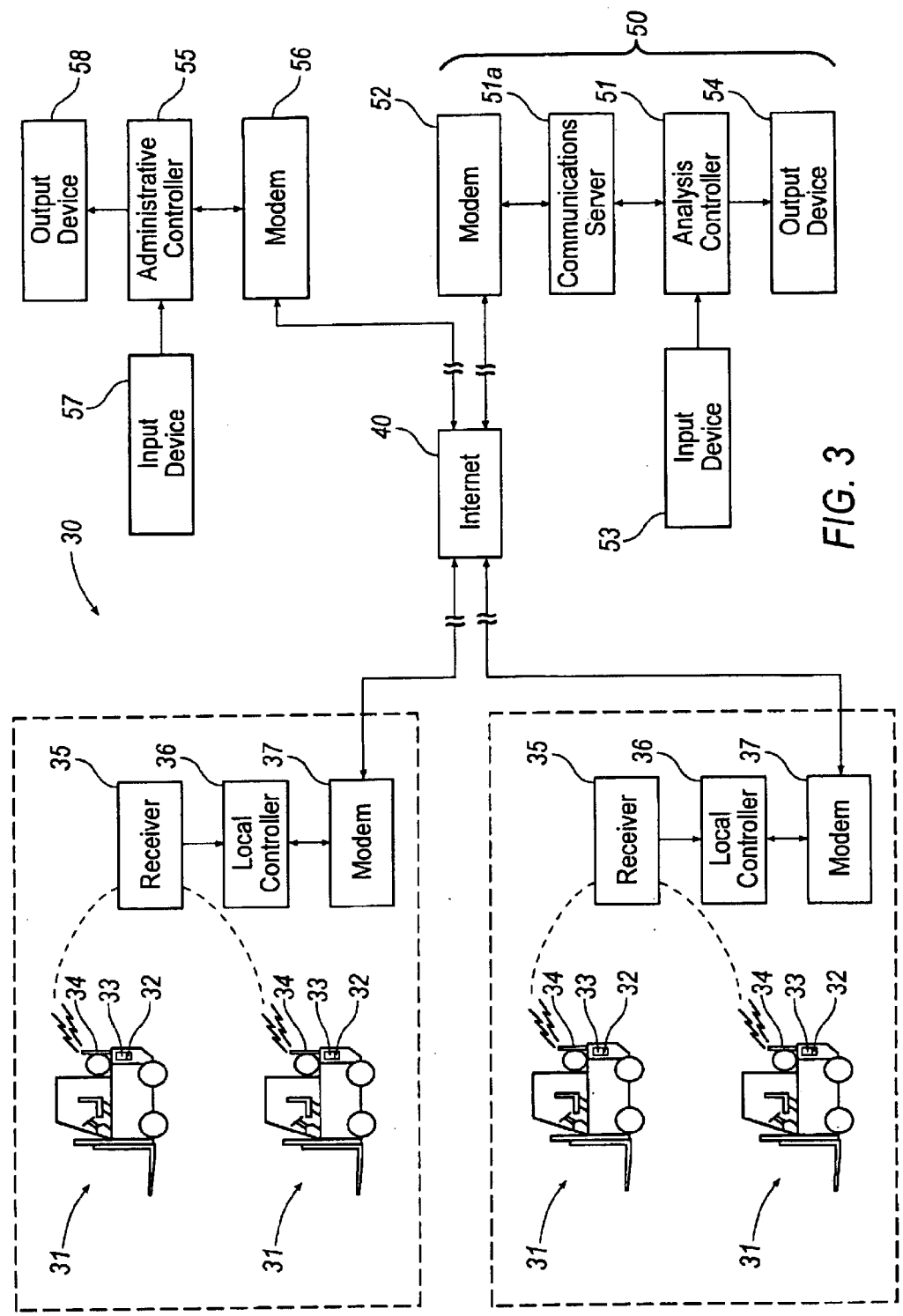
FIG. 3 is a schematic block diagram of a computer-based system for tracking and managing a plurality of assets in accordance with this invention.

Referring now to FIG. 3, there is illustrated schematic block diagram of a computer based system, indicated generally at 30, for tracking and managing a plurality of assets, indicated generally at 31, in accordance with this invention. As with the prior art system 10 described above, the illustrated assets 31 are represented as a plurality of pieces of movable industrial equipment, such as a plurality of conventional forklifts or similar machinery, used in the manufacture of goods in a factory environment. However, the method of this invention can be used to track and manage any type of asset 31, such as those described above, used in the manufacture of goods or the performance of services.

As above, the basic structure and operation of each of the forklifts 31 are well known in the art, and, therefore, require no discussion for a complete understanding of this invention. However, unlike the forklifts 11 of the prior art system 10, a data acquisition device 32 is provided on each of the forklifts 31 for sensing and storing one or more operating characteristics of the associated forklift 31. The basic structure and operation of each of the data acquisition devices 32 are conventional in the art. For example, each of the data acquisition devices 31 may be embodied as an electronic processor or controller that can sense or be otherwise responsive to one or more operating conditions of the associated forklift 31. Each of the data acquisition devices 31 can be responsive to any desired operating conditions of the forklift 31 that might be considered important in making effective management decisions regarding the operation of the forklift 31. Such desired operating conditions can, for example, include the time duration of use (and non-use), distances traveled, the extent of fork usage, the nature of hydraulic system utilization, and the like. More typically for industrial assets, the most importance criteria is time duration of use. The sensed operating conditions of the forklifts 31 are preferably stored at least temporarily in a memory of the data acquisition device 32 for subsequent communication to a remote analysis system, indicated generally at 50, for analysis in the manner described in detail below. Thus, the data acquisition devices 32 sense and store the desired operating conditions for each of the forklifts 31 during use.

Each of the forklifts 31 is further provided with a transmitter 33 or other communications system for transmitting the acquired data from the data acquisition device 32 to the remote analysis system 50 for analysis. Each of the transmitters 33 may be embodied as any conventional device for transmitting the acquired data to the remote analysis system 50, such as a hard-wired communications interface. However, as is well known, each of the forklifts 31 is a movable vehicle that is capable of traveling extensively throughout the particular environment in which it is used. To facilitate the transmission of the acquired data, therefore, the transmitter 33 is preferably embodied as a wireless communications system, such as represented by an antenna 34. The transmitters 33 and the wireless communications systems 34 can be embodied as conventional radio frequency transmitters provided on each of the forklifts 31 that transmit electromagnetic signals. However, other well known forms of wireless communication, such as those utilizing light or sound, may be used in lieu of a radio frequency transmitter.

The wireless communications systems 34 are adapted to transmit signals that are representative of the sensed operating conditions of the forklifts 31 through space to a receiver 35. In contrast to the forklifts 31 that can travel extensively throughout the environment in which they are operated, the receiver 35 is preferably provided at a fixed location within that environment. If desired, a plurality of such receivers 35 may be provided at different locations within the environment in which the forklifts 31 are operated. As the forklifts 31 move about the environment during use, they will occasionally pass by or near the receiver 35. When this occurs, the receiver 35 receives the data transmitted from the respective data acquisition units 32. The receiver 35 is also conventional in the art.

Preferably, the data acquisition units 32 and the receivers 35 are in bi-directional communication with one another. One advantage of such bi-directional communication is that the data acquisition unit 32 can send out a query signal on a predetermined basis to be received by the receiver 35 when the two units 32 and 35 are sufficiently close to communicate reliably with one another. Thus, when the data acquisition unit 32 contacts the receiver 35, the receiver 35 can send a first signal back to the data acquisition unit 32 to instruct it to begin transmitting the acquired data. At the completion of the data transfer, the receiver 35 can send a second signal back to the data acquisition unit 32 to acknowledge the receipt of the transmitted data. A conventional error checking algorithm can be used to confirm the accuracy and completeness of the transmitted data and, if necessary, request a re-transmission thereof.

Another advantage of such bi-directional communication is that data in the form of new commands, program updates, instructions, and the like can be sent to the data acquisition units 32 from the receiver 35. In some instances, such as when a data acquisition unit 32 is in generally continuous communication with a receiver 35, a user of the forklift 31 can be prompted to provide certain information for transmission to the receiver 35 for further analysis.

The receiver 35 is connected to a local controller 36. The local controller 36 is also, of itself, conventional in the art and may be embodied as an electronic controller that is adapted to receive and store at least temporarily the data from each of the receivers 35. Alternatively, if the assets 31 are fixed in position, such as in the case of a plurality of stationary machines used in a manufacturing environment, the receiver 35 or receivers 35 may be provided on movable structures that move about the environment to receive the information transmitted therefrom. In either event, it is desirable that the local controller 36 acknowledge receipt of the information transmitted from the data acquisition devices 32, allowing the data acquisition devices 32 to delete the transmitted information and begin storing newly acquired information. A combined system including the data acquisition device 32, the transmitter 33, the wireless communications system 34, the receiver 35, and software for operating the local controller 36 to gather and report data is commercially available, such as from I.D. Systems, Inc. of Hackensack, New Jersey or Requip (formerly SXI).

In a preferred embodiment, the various elements located in an asset 31 are hardwired into the electrical system of the asset to minimize the possibility of undesirable failure or tampering.

Thus, after the forklifts 31 have been operated for a period of time, the local controller 36 will have gathered and stored therein a certain amount of information regarding the individual operating characteristics for each of the forklifts 31. The local controller 36 is programmed to periodically transmit the information stored therein to the remote analysis system 50 for analysis. This can be accomplished by providing the local controller 36 with a conventional modem 37 or other communications device that can convert the stored information into a format that is compatible for transmission through an electronic communications network, such as the internet 40. As is well known, the Internet 40 is a digital electronic communications network that connects computer networks and organizational computer facilities around the world. Access to the Internet 40 can be easily obtained in most locations through the local telephone lines or by similar means.

The system 30 of this invention may be used to track and manage a plurality of assets 31 located at any desired physical location. Additionally, the system 30 of this invention may be used to track and manage assets 31 located at a plurality of different physical locations, as suggested by the dotted lines in FIG. 3. Each different physical location can be provided with one or more receiver 35, a local controller 36, and a modem 37 to connect the system 30 to the Internet 40.

As mentioned above, the sensed operating conditions of the forklifts 31 are intended to be transmitted to the remote analysis system 50 for analysis. Referring again to FIG. 3, it can be seen that the remote analysis system 50 includes an analysis controller 51 that is connected to communicate through the internet 40 by means of a modem 52 or similar communications device. If desired, a communications server 51a may be connected between the analysis controller 51 and the modem 52. The communications server 51a is provided to selectively receive and organize the information from each of the local controllers 36 for delivery to the analysis controller 51. The analysis controller 51 can be embodied as any conventional electronic controller that is capable of receiving the sensed operating conditions of the forklifts 31 and for processing that information in a desired manner described in detail below. Ideally, the sensed operating conditions of the forklifts 31 are used to automatically generate and analyze management reports relating to the procurement and utilization of a plurality of the forklifts 31 to maximize productivity and to reduce operating costs and administrative burdens. An input device 53 and an output device 54, both of which are conventional in the art, may be connected to the analysis controller 51.

As also shown in FIG. 3, one or more administrative controllers 55 (only one is illustrated) can be connected to the internet 40 through respective modems 56 or similar communications devices. Each of the administrative controllers 55 can also be embodied as any conventional electronic controller that can request and receive information from the remote analysis system 50 through the Internet 40. In a manner that is described in detail below, the administrative controllers 55 are provided to request and receive the management information generated by the remote analysis system 50. If desired, the local controller 36 can also function as an administrative controller 55, although such is not necessary. An input device 57 and an output device 58, both of which are conventional in the art, may be connected to the administrative controller 55.

Figure 4A:
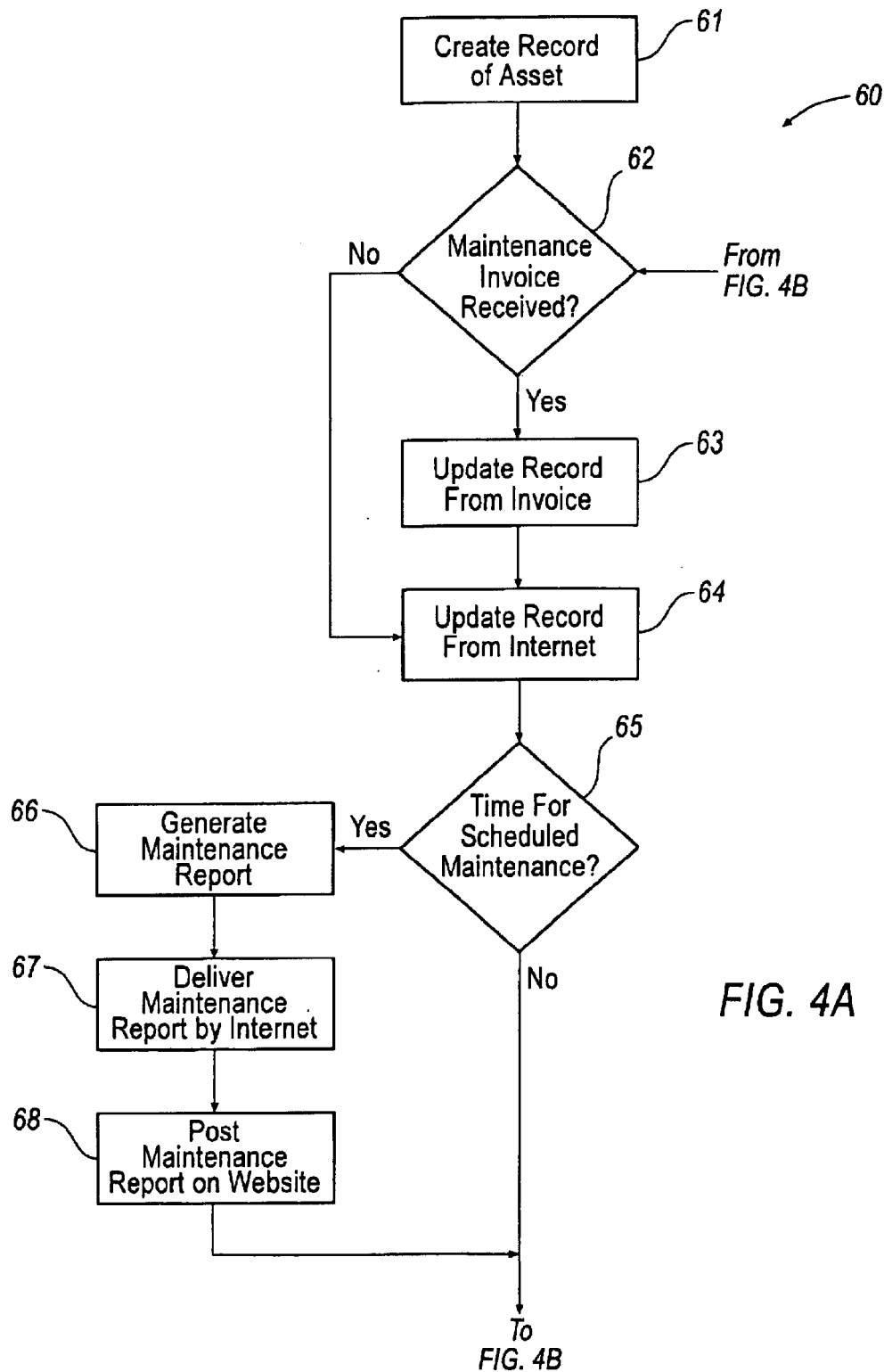
FIGS. 4A through 4C are three portions, respectively, of a flow chart of a method for tracking and managing assets in accordance with the computer based system illustrated in FIG. 3.
Figure 4B:
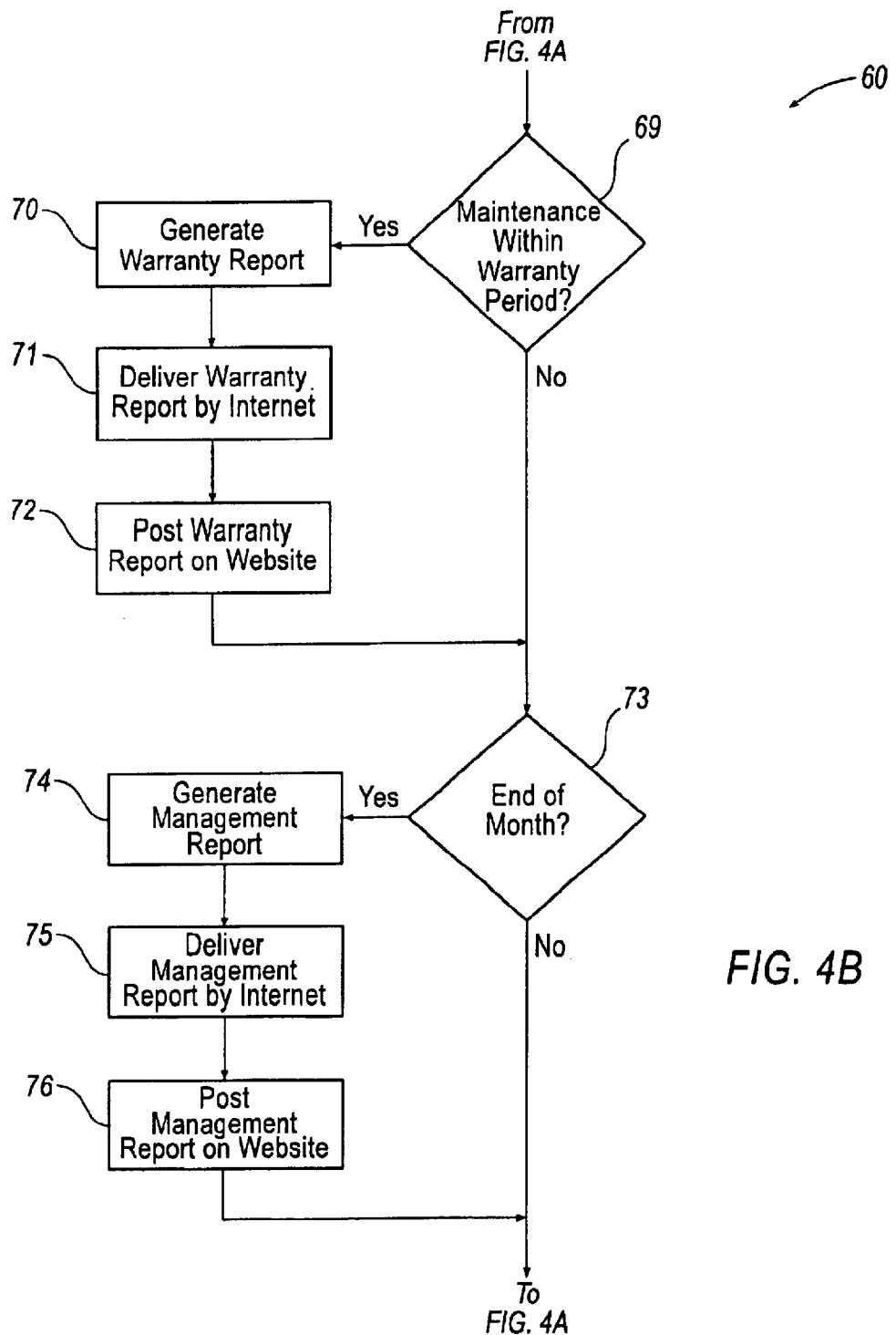
Figure 4C:
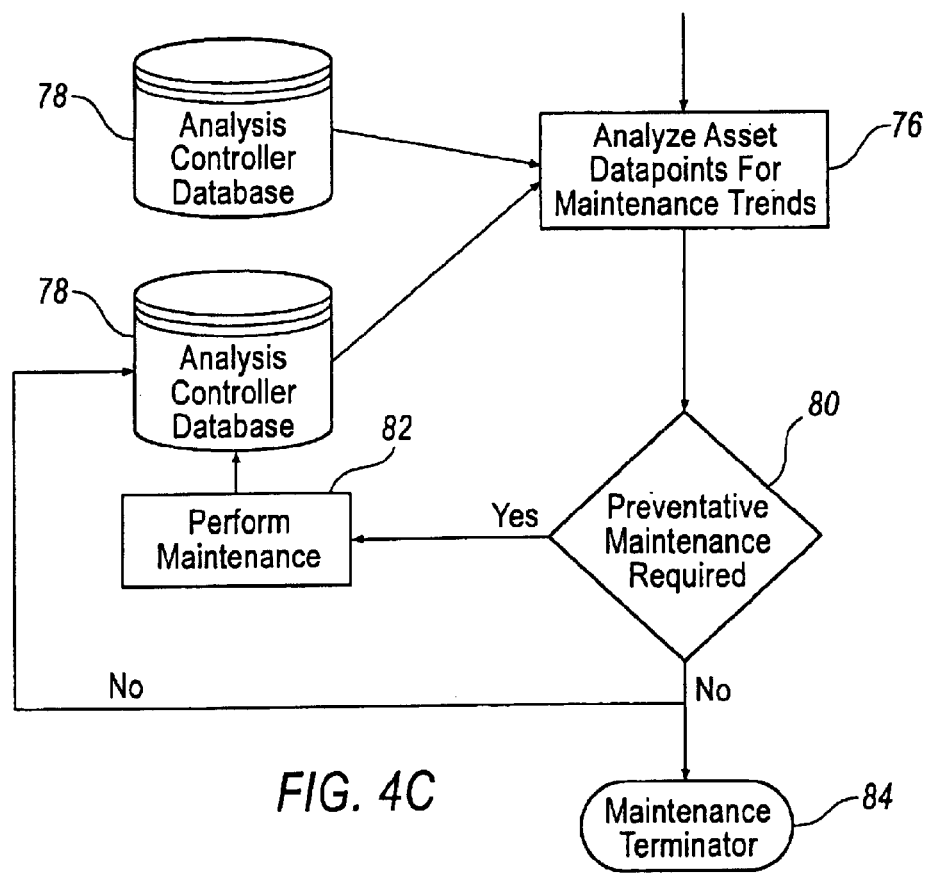

Referring now to FIGS. 4A through 4C, there is illustrated a flow chart, indicated generally at 60, of a method for tracking and managing the assets 31 in accordance with this invention using the computer based system 30 illustrated in FIG. 3. Throughout this discussion also, reference will be made to a first person or entity that owns or operates the assets 31 that are being tracked and to a second person or entity that is responsible for tracking information relating to such assets 31. As above, it will be appreciated that a single person or entity may not only own and operate the assets 31, but also track the information relating thereto.

In an initial step 61 of the method 60, a record is created for each individual asset 31 by the person or entity responsible for tracking such assets, such as one of the forklifts 31 illustrated in FIG. 3. The record can be created electronically within the analysis controller 51 by means of the input device 53 and can include a variety of information that is desired to be tracked for management purposes, including all of the information described above in connection with the forklifts 11 and the analysis controller 13. Additionally, the record can further include information regarding the nature and time duration of a warranty provided by the manufacturer or supplier of the assets 31. Such warranty information can be used in the manner described in further detail below to automatically determine whether the responsibility for the maintenance being performed on the asset 31, either in whole or in part, should rest with the manufacturer or the supplier of the asset 31 or with the owner or user of the asset 31.

In a second step 62 of the method 60, it is determined whether a maintenance invoice has been received by the person or entity responsible for tracking the assets 31. Such maintenance invoices can be generated and delivered in the same manner as described above. If it is determined that a maintenance invoice has been received by the person or entity responsible for tracking the assets 31, the method branches from the step 62 to a step 63, wherein the record contained in the analysis controller 51 relating to the particular asset 31 is updated with the information contained in the maintenance invoice in the same manner as described above. Next, the method enters a step 64 wherein the record contained in the analysis controller 51 relating to the particular asset 31 is updated with information from the internet 40. Alternatively, if it is determined that a maintenance invoice has not been received by the person or entity responsible for tracking the assets 31, the method branches directly from the step 62 to the step 64.

As discussed above, the local controller 36 will have gathered and stored therein a certain amount of information regarding the individual operating characteristics for each of the forklifts 31. The local controller 37 is programmed to periodically transmit the information stored therein to the remote analysis system 50 for analysis. The analysis controller 51 can include a memory circuit for storing this information from the local controller 36. The transmission of the information from the local controller 36 to the analysis controller 51 can be performed in real time, upon occurrence of predetermined events (such as the gathering of a predetermined amount of information), or at predetermined time intervals. In any event, the record contained in the analysis controller 51 is automatically updated with the latest information regarding the status of the asset 31, without any human intervention.

Based upon the updated information contained in the record of the asset 31, the analysis controller 51 next determines whether a sufficient period of time or usage has elapsed as to trigger the performance of periodic routine maintenance for that asset 31. This determination can be made in the same manner as described above in connection with 24 of the prior art method 20. If it is determined that a sufficient amount elapsed time or amount of usage had occurred, the method 60 branches from the step 65 to a step 66, wherein an electronic maintenance report is generated. If desired, a hard copy of the maintenance report can also be generated by an output device 54 connected to the analysis controller 51. Then, in step 67 of the method 60, the electronic maintenance report generated in the step 66 is delivered from the person or entity responsible for tracking the asset 31 to the person or entity that owns or operates the asset 31 through the Internet 40. As above, the maintenance report can advise the person or entity that owns or operates the asset 31 that the time had arrived for the performance of periodic routine maintenance. Moreover, if a specific fault code has been Alternatively, the maintenance report 55 can be delivered to a specialized maintenance organization responsible for maintenance of the assets 31. The electronic maintenance report can, for example, be delivered through the Internet 40 to one or more of the administrative controllers 55 as desired. Alternatively, or additionally, the electronic maintenance report can be delivered through the Internet 40 to one or more of the local controllers 36. Also, in step 68 of the method 60, the electronic maintenance report generated in the step 66 is posted on a website maintained on the Internet 40. The website may be maintained either by the person or entity responsible for tracking the asset 31 or by the person or entity that owns or operates the asset 31 through the Internet 40. As opposed to the direct electronic delivery of the maintenance report to a particular person or group of persons contemplated in the step 67, the step 68 contemplates that the maintenance report is made available to such person or group of persons at their request over the Internet 40.

Thereafter, the method 60 enters a step 69, wherein it is determined whether any maintenance that has been performed on the asset 31 occurred within the warranty period provided by the manufacturer or supplier. Alternatively, if in the step 65 of the method 60, it was determined that a sufficient amount elapsed time or amount of usage had not yet occurred, the method 60 branches directly from the step 65 to the step 69. In either event, this determination can be made by comparing the date of service or amount of usage of the asset 31 with the warranty information contained in the record for that asset 31 contained in the analysis controller 51. If it is determined that service on the asset 31 occurred within the warranty period, the method 60 branches from the step 69 to a step 70, wherein an electronic warranty report is generated. If desired, a hard copy of the warranty report can also be generated by the output device 54 connected to the analysis controller 51. Then, in step 71 of the method 60, the electronic warranty report generated in the step 70 is delivered from the person or entity responsible for tracking the asset 31 to the person or entity that owns or operates the asset 31 through the Internet 40. As above, the warranty report can advise the person or entity that owns or operates the asset 31 that the service performed on the asset 31 should be paid for by the manufacturer or supplier of the asset 31. The electronic warranty report can, for example, be delivered through the Internet 40 to one or more of the administrative controllers 55 as desired. Alternatively, or additionally, the electronic warranty report can be delivered through the Internet 40 to one or more of the local controllers 36. Also, in step 72 of the method 60, the electronic warranty report generated in the step 70 is posted on a website maintained on the Internet 40. The website may be maintained either by the person or entity responsible for tracking the asset 31 or by the person or entity that owns or operates the asset 31 through the Internet 40. As opposed to the direct electronic delivery of the warranty report to a particular person or group of persons contemplated in the step 71, the step 72 contemplates that the warranty report is made available to such person or group of persons at their request over the Internet 40.

Thereafter, the method 60 enters a step 73, wherein it is determined whether a predetermined period of time has elapsed to generate a periodic management report covering some or all of the assets 31 being tracked. Alternatively, if in step 69 of the method 60, it was determined that a sufficient amount elapsed time or amount of usage had not yet occurred, the method 60 branches directly from the step 69 to the step 73. In either event, such management reports are typically generated on a monthly basis. Thus, if the end of the month has occurred, the method 60 branches from the step 73 to a step 74, wherein an electronic management report is generated. If desired, a hard copy of the management report can also be generated by the output device 54 connected to the analysis controller 51. Then, in step 75 of the method 60, the electronic management report generated in the step 74 is delivered from the person or entity responsible for tracking the asset 31 to the person or entity that owns or operates the asset 31 through the Internet 40. As above, the management report can advise the person or entity that owns or operates the asset 31 of the same information as the management reports discussed above. The electronic management report can, for example, be delivered through the Internet 40 to one or more of the administrative controllers 55 as desired. Alternatively, or additionally, the electronic management report can be delivered through the Internet 40 to one or more of the local controllers 36. Also, in step 76 of the method 60, the electronic warranty report generated in the step 74 is posted on a website maintained on the Internet 40. The website may be maintained either by the person or entity responsible for tracking the asset 31 or by the person or entity that owns or operates the asset 31 through the Internet 40. As opposed to the direct electronic delivery of the management report to a particular person or group of persons contemplated in the step 75, the step 76 contemplates that the management report is made available to such person or group of persons at their request over the Internet.

FIG. 4C demonstrates an additional functional aspect of method 60 using the inventive system. In addition to determining whether a maintenance invoice has been received, if scheduled maintenance has been performed, and determining the party responsibility for certain maintenance activities, it is possible to poll asset data points at point 76 from an analysis controller database 78 associated with one or more discrete analysis controllers 51 that may be associated with one or more businesses. A plurality of databases 78 are shown. One or more separate databases may be combined to form a logical database 78. When a maintenance organization has access to various asset fleets of the same type or make of equipment, it may be beneficial to analyze the relevant information using a larger available knowledgebase of information to analyze appropriate trends. By analyzing the data points, certain maintenance trends can be analyzed and problems can be anticipated before they affect asset utilization. For example, if it turns out that asset 31 has a tendency to need new batteries after a certain period of usage; the need for such batteries can be anticipated and stocked on site when appropriate to facilitate maintenance. As shown in FIG. 4C, once the various trends have been analyzed for assets 31, at decision point 80 it is determined whether preventative maintenance is required. If it is required, the maintenance is performed as shown at point 82 and the information is stored in database 78. The asset data points are then analyzed again until it is determined that no further preventative maintenance is required. Then the system terminates at point 84. Thus, FIGS. 4A through 4C illustrate the use of critical information from assets 31 to perform maintenance and to provide a methodology for providing access to information by various third parties.

Figure 5:
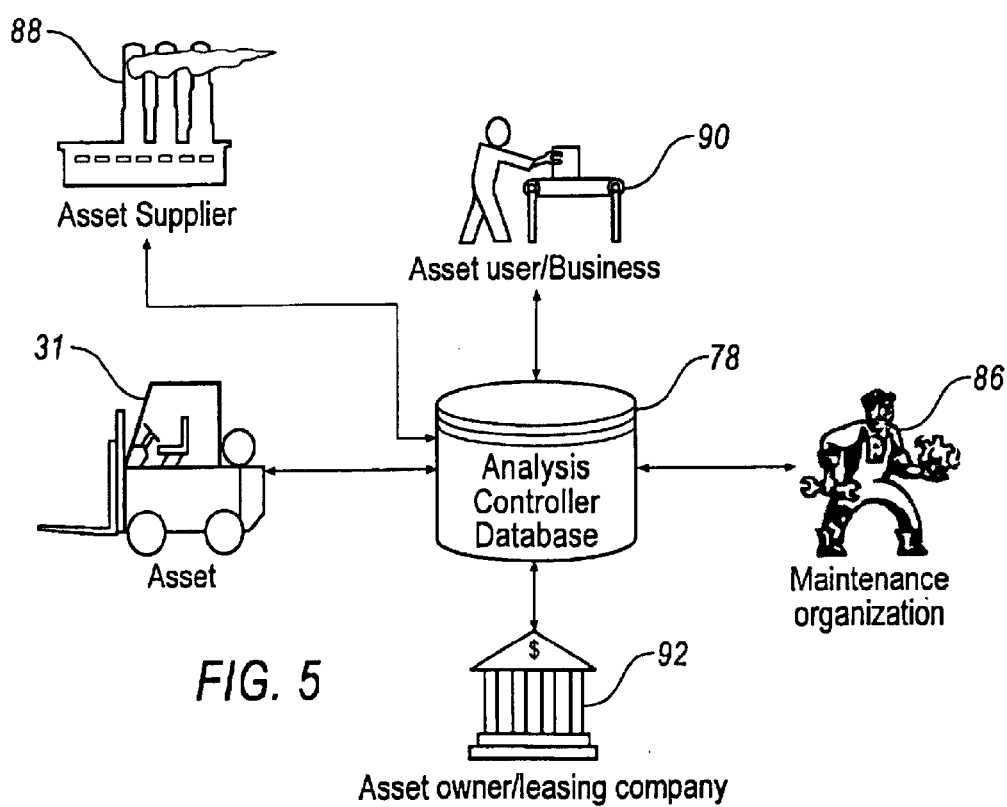
FIG. 5 illustrates the relationship of various parties to a database associated with an analysis controller.

FIG. 5 illustrates the beneficial interrelationships that promote efficiency by having various parties associated in some way with an asset 31 in one or two-way communication with analysis controller 51 either by way of administrative controller 55, reports 71 or 75, web site postings electronic mail, or the like. As already discussed above, asset 31 provides usage and performance data that is stored in the asset controller 51 according to certain predetermined criteria important for that asset. As also discussed above, a maintenance organization 86 both receives and provides information to database 78. While business 90 may provide its own maintenance of assets 90, for the discussion a separate maintenance organization is illustrated.

Warranty information as shown by steps 70 through 72 of FIG. 4B is of particular interest to the asset manufacturer or supplier 88. While it may not be appropriate for a supplier 88 to be able to alter information in database 78, the ability to quickly and accurately collect information concerning warranty obligations and the like is of particular benefit to all of the parties. For example, warranty issues may be caught more quickly, ultimately reducing asset cost and operation while simultaneously promoting asset up time. The ability of the asset user 90 to analyze and administer assets 31 has also been discussed in detail. However, key advantages also result by allowing the owner of asset 31 to analyze key data associated with asset 31. In the illustrated embodiment, it is assumed that the owner of the asset 31 is a separate asset owner 92 such as a leasing company, as opposed to business 90 itself, although this is not required.

Figure 6:
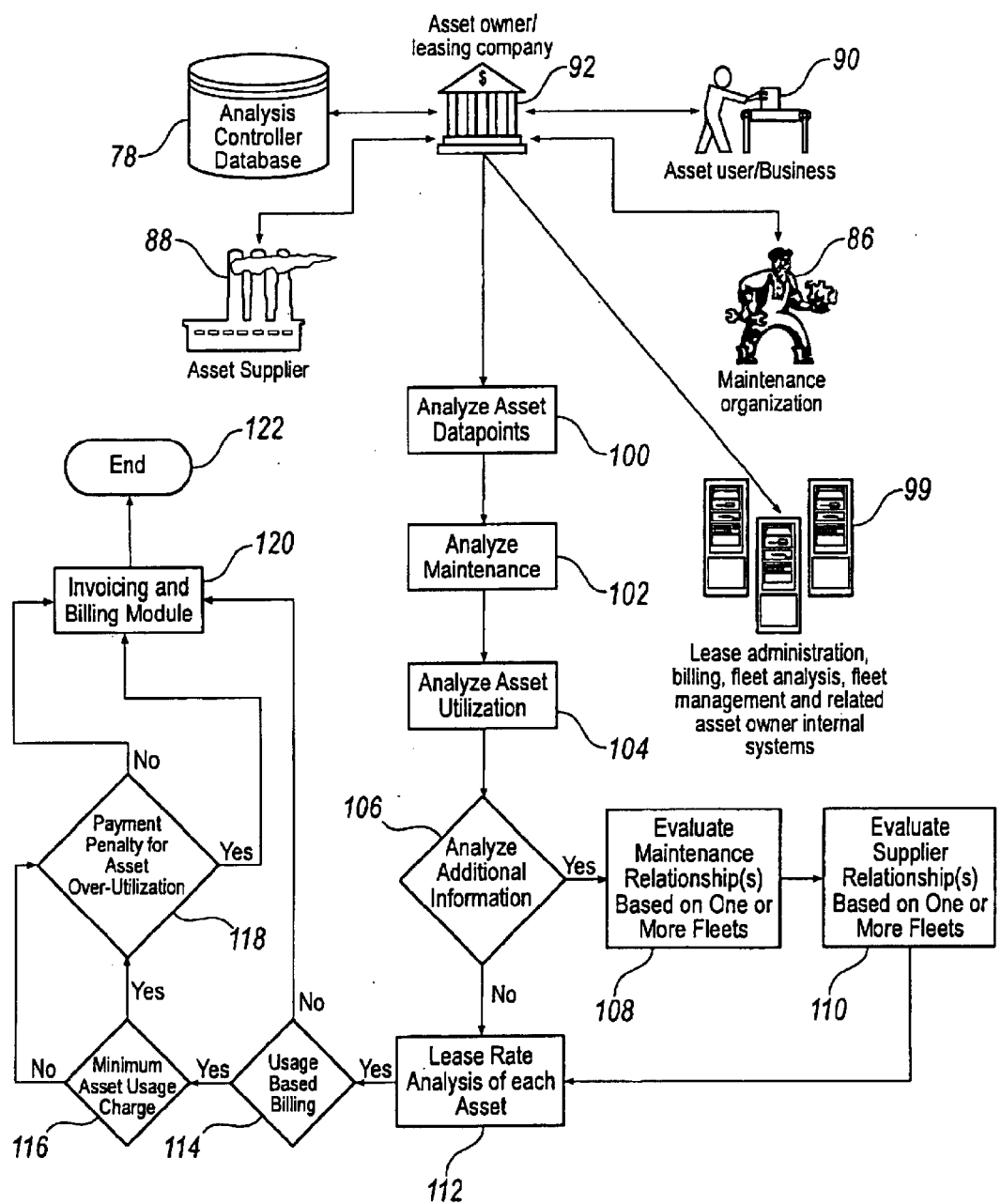
FIG. 6 is a flow chart of a sub-system illustrating the analysis of asset-related information to determine responsibility for asset utilization, and developing a lease relationship between an asset owner and an asset user based on asset utilization criteria.

The advantages of an asset owner 92 having at least one and possibly two-way access to the real-time and historical information stored in analysis controller database 78 as well as the ability to communicate with supplier 88, maintenance 86, and business 90, is illustrated in sub-system 98 illustrated in FIG. 6. Sub-system 98 is activated by the asset owner 92 using data from database 78, but typically utilizing its own lease administration and billing systems. In many cases it is also using its own fleet analysis and management systems, which are typically aggregating information from a number of different fleets associated with a plurality of businesses 90. These various systems, one or more of which may be used independently or in concert, are collectively shown at point 99. As noted above, web-site access, generated reports, analysis controllers 51, and administrative controllers 55 provide exemplary access points for pulling asset information from system 30.

An asset owner 92 and an asset user such as business 90 share the common interest in maximizing efficiency by taking into account such variables as asset usage and asset costs. The more information that is available, the more likely that efficiency is maximized. In traditional leasing relationships involving non-fixed or movable assets such as forklifts where minimal asset utilization information is available, the burden of determining the point of maximum efficiency typically rests with business 90, since it has control over the asset. Therefore, a leasing company 92 typically enters into a lease arrangement where a fixed lease amount is paid in periodic payments by business 90 over the life of the lease. At best, only minor flexibilities are provided. When leasing company 92 regains control of an asset 31 at the end of the lease term, there is uncertainty concerning the condition of the asset. This uncertainty also typically rests with business 90 in the form of a financial cushion incorporated into the leasing relationship.

However, such uncertainty is minimized in the present invention. As shown at point 100, asset owner 92 is able to analyze the various desired objectively generated asset data points associated with an asset 31. As noted above, these data points can include the time of asset usage within a fixed time period, distance traveled, and certain performance parameters associated with the particular asset (e.g., hydraulic system usage or fork usage for fork lifts). As noted above, in practice, for industrial assets the time of use is the most important single data point. Then, as shown at point 102, asset owner 92 may analyze maintenance considerations. For example, a major routine overhaul as compared to a system failure can be analyzed. Then at point 104, the asset owner 92 can compare the raw data from the asset with maintenance conducted during the same time period. By comparing the raw data with maintenance considerations, the owner is able to analyze the asset utilization under the control of business 90 if maintenance organization 86 and supplier 88 are different third parties. For example, the asset owner 92 can determine that an asset 31 has been used very little during the time period, even allowing for maintenance. Alternatively, the owner may determine that the asset is being used continuously when not undergoing maintenance, possibly suggesting that additional assets may be appropriate to reduce overall maintenance stress on the pre-existing asset.

Additional information can be analyzed by the asset owner as shown at decision point 106. Typically, the information includes data associated with other parties having access to database 78. As shown at point 108, for example, the asset owner 92 can evaluate the maintenance relationship with maintenance organization 86. If the relationship has been very positive, an appropriate incentive may be provided to the organization in the form of shared cost savings. Alternatively, if the relationship has been negative, an appropriate penalty may also be implemented. The same considerations are available if business 90 acts as its own maintenance organization 86.

Similarly, the asset owner 92 may evaluate its relationship with the asset supplier 88 as shown at point 110. The information may affect asset payments from the owner to the supplier or the future relationship of the parties.

These various advantages are applicable even if asset owner 92 and business 90 are the same entity. However, more typically with industrial equipment, asset owner 92 is different than asset user 90, where the two parties have entered into a lessor/lessee relationship. In such a case, the information in database 78 may be used to mutually maximize the relationship between the asset owner 92 and the business 90. With appropriate safeguards asset owner 92 may be willing to share in a greater portion of the risk associated with the utilization of asset 31 in determining a lease rate based on an analysis of each user fleet or individual asset as shown at point 112. Most significantly, rather than entering into a traditional fixed lease amount as noted above, asset owner 92 may be willing to enter into a 5 hybrid lease arrangement wherein the lease charge may be a combination of one or more of the following elements: 1) a minimum payment that has to be made if asset utilization is below a pre-determined minimum threshold; 2) a usage based-payment that is made if usage is above the pre-determined minimum threshold and below a pre-determined maximum threshold; 3) a penalty payment or surcharge is made if utilization is higher than the predetermined maximum threshold; and 4) payments/rewards based on incentive issues such as asset re-allocation or timely maintenance.

The decision of whether to use usage-based billing based on one or more objective criteria based on an analysis of asset utilization is shown at decision point 114. The decisions to charge either a minimum payment if a certain usage level is not met, or to charge a usage penalty above a maximum appropriate usage level, are shown by decision points 116 and 118 respectively. Thus, a variable-amount lease may be developed based on an analysis of objective criteria that is based in large part on the actual portion of an asset's life that is consumed by the asset user (e.g., usage hours). In a preferred embodiment, the analysis is based on a pre-determined usage/pricing matrix in combination with actual usage for a specified time period. Once a level of maximum efficiency has developed, leasing will typically be primarily, if not solely, based on asset usage billing.

Through the use of the innovative leasing arrangement based on improved information availability to asset owner 92, the expenses of an asset user such as business 90 can be more accurately aligned with usage and asset value consumption. More operational flexibility is provided to business 90. When leasing is based predominantly on asset usage billing, a business 90 is able to adopt true off-balance sheet financing (i.e., the business is not required to note a financial obligation even in the footnotes of various financial reports as opposed to standard off-balance sheet leasing where a company must disclose the lease in footnotes even if the lease does not show up on the balance sheet). At the same time, asset owner 92, can collect information from a variety of sources to maximize its relationships with its own vendors and customers to the benefit of all related parties by minimizing inefficiencies and providing appropriate accountability with maximum accuracy and validity tied to a minimal likelihood for mistakes, misinformation, or even fraud.

These various factors can be adjusted dynamically by the asset owner 92 as a knowledge base is collected within its internal systems 99 and based on the actions of the other related parties. For a sophisticated asset owner with numerous fleets, it can conduct appropriate analyses over all of its fleets to determine certain trends, which it may advantageously use.

For example, if supplier 88 or maintenance organization 86 is responsible for abnormally low asset utilization as opposed to actions within the control of business 90, then the risk associated with these possibilities can be shared between asset owner 92 and various affected businesses 90 and transferred in some fashion to the responsible party. Thus, in a more preferred embodiment of the invention, asset usage is adjusted for maintenance considerations if business 90 is not responsible for its own maintenance.

As shown at point 120, once the readily available information is analyzed in view of the business relationship between an asset owner 92 and a business 90, an invoice and billing module associated with the asset owner's own internal systems 99 is invoked that generates an appropriate invoice that is sent by the asset owner to the business for payment and subsystem 98 terminates at point 122. In a preferred embodiment, once sub-system 98 is developed for a particular situation, and in the absence of an extraordinary event, invoicing is automated based strictly on the objective criteria developed with minimal outside involvement.

A key advantage of the present invention is that real-time data is collected by data acquisition device 34 and timely transmitted to local controller 36 for transmission to database 78 of analysis controller 51. If incomplete or limited data representing only a small portion of the appropriate asset data points are transmitted, then appropriate decisions cannot be made to maximize asset utilization. For example, in the case of forklifts, both time of usage and distance traveled help provide information concerning asset utilization and maintenance considerations.

Thus, the computer based system 30, including subsystem 98, of the present invention provides a superior method for tracking and managing the assets 31 than the prior art system 10. First, by providing the assets with the data acquisition devices 32 and the communications system 33 and 34, the operational characteristics and other information regarding the assets 31 is automatically sensed and transmitted to the analysis controller 51 on a real time basis, without requiring human intervention or assistance. Second, the analysis controller 51 is programmed to analyze such information as it is received and to automatically generate maintenance and warranty reports in response thereto. Third, all of the reports generated by the analysis controller 51 are automatically delivered to the appropriate persons through the Internet 40, either directly to one or more of the administrative controllers 55 or by posting on a web site, electronic mail or similar mechanisms. Fourth, as shown by subsystem 98, the information can be used to maximize asset usage efficiency. As a result, the computer based system 30 facilitates the gathering, analyzing, and delivering of information relating to the procurement and utilization of the assets 31 so as to maximize productivity and to reduce operating costs and administrative burdens to the benefit of all parties having a relationship with the asset and an interest in its performance.

Figure 7:
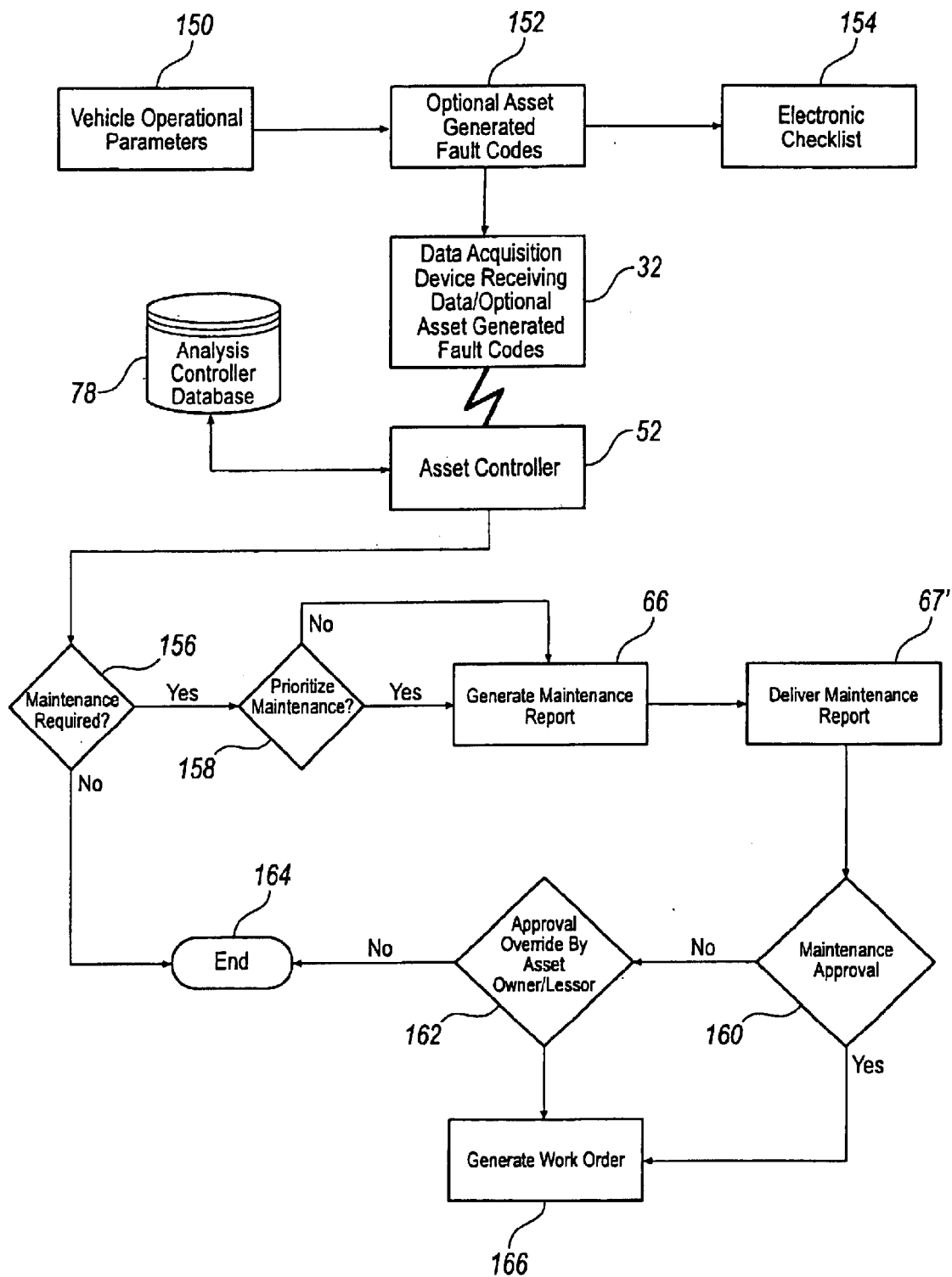

The providing of maintenance to an asset 31 is illustrated in further detail in FIG. 7. In addition to determining whether it is necessary to provide scheduled maintenance as noted at step 65 of FIG. 4A, changes in operational parameters associated with asset 31 as shown at point 150 may result in the generation of a specific fault code if a maintenance problem is detected that requires a more expeditious response. The fault code may be generated by the asset itself using one or more sensors associated with operational parameters of asset 31 as shown by point 152 and communicated to the data acquisition device 32. In addition, analysis controller 51 may analyze the raw operational data received from the asset 31 and compare it with analysis controller database 78 including the history of the specific asset 31 as well as the history of similar assets from which maintenance trends may be determined as discussed with respect to FIG. 4C above. Based on an analysis of such trends, proactive lower cost maintenance can be timely performed that results in the avoidance of higher cost maintenance at a later date, which happens in the absence of real-time information available for review and analysis.

A fault code may even be generated based on the actions of the asset operator. In a preferred embodiment of the invention, an electronic checklist 154 is completed by the asset operator on a regular basis, which may include information concerning asset performance that is more detailed than that available from a review of raw operational parameters. In accordance with OSHA requirements, for example, at the end of each shift, a forklift operator must complete a checklist concerning the performance of the asset during the shift. Some of the questions associated with checklist 154 are directed to maintenance issues. Therefore, in a preferred embodiment of the invention, checklist 154 would be completed electronically at the asset 31, and transmitted by way of the data acquisition device 32 to analysis controller 51 as discussed above. The information would be analyzed to determine if an OSHA/repair need is identified. Preferably, the analysis is automated in accordance with a comparison of the operational status with pre-determined rules. For example, if a question asks if there is a hydraulic leak for a forklift and the answer is "yes", then maintenance would be appropriate.

Once it is determined that maintenance of some type is required as shown at point 156 based on an analysis of the operational status of asset 31, a maintenance report 66 is generated as also shown in FIG. 4A and made available electronically at point 67' such as by the Internet or by posting on a website as also shown in FIG. 4A. The use of electronic mail, or the providing of real-time access to the raw data stored within database 78 by the maintenance organization 86, shown in FIG. 5, is also possible to generate the maintenance report 66. An advantage of providing a maintenance organization 86 real-time access to the raw data representing the operational status of asset 31 is that it may develop specialized analysis tools based on its own expertise in maintenance, resulting for example in the creation of specialized rules for use in automatically analyzing raw data in determining whether maintenance is required, minimizing the need for manual review and determination.

In a preferred embodiment, the priority of the proposed maintenance required 158 is noted on the maintenance report. For example, critical maintenance issues should take precedence over routine issues. Moreover, the system generally institutes an approval process as shown at point 160. For example, if the proposed maintenance is related to warranty work such as noted with respect to step 69 of FIG. 4B, the manufacturer or supplier should approve the maintenance. If a lessee is responsible for the proposed maintenance, it should approve the maintenance before it is performed. In some cases, the maintenance organization 86 itself approves the maintenance, such as when it has a contract that involves pre-payment of particular maintenance. Finally, as shown at point 162, in some cases it may be desirable to have the lessor or owner of the asset have the ability to review and override any refusals to perform maintenance since it has the ultimate responsibility for asset 31. If no approvals are given, the process is terminated at point 164. A review of any automated rules that generated a request for maintenance approval may also be appropriate. When maintenance approval is rejected, any automated rules that generated the original maintenance request can be finetuned by including the results of the approval process. Over time, almost all maintenance requests should be generally approved. Information regarding approval is stored in database 78.

For preventative maintenance, it is expected that pre-approval will generally be granted by the necessary parties based on prior agreement as to the nature and timing of such maintenance.

Figure 8:
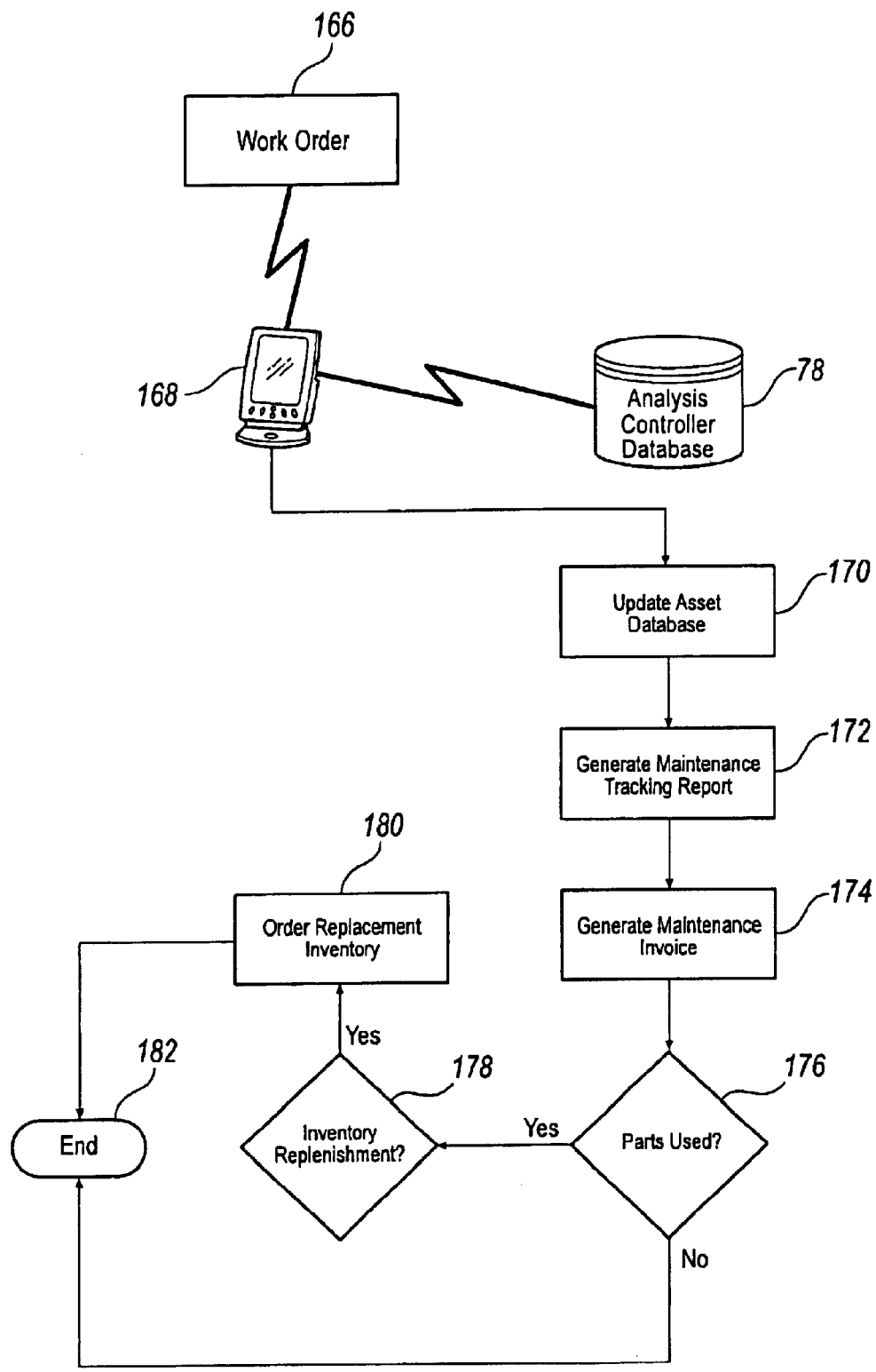

Once maintenance has been approved, a work order 166 is generated. As shown in FIG. 8, work order 166 is sent electronically to appropriate maintenance personnel that contains all of the critical operating data required to effectively schedule and carry out the maintenance. Typically, for example, the data includes hour meter reading, any fault codes, asset identification criteria, operator of record, contact information, and asset location. Moreover, based on information contained within the fault code or retrieved from the knowledgebase, information concerning anticipated parts may also be provided as well as the nearest location from where they may be retrieved (e.g., at a customer location, or from a local servicing dealer). Finally, the work order 166 preferably contains the past recent history of the particular asset 31 so that the mechanic can use this information to expedite maintenance.

In a preferred embodiment of the invention, the work order 166 is transmitted electronically to a handheld device 168 associated with specific maintenance personnel assigned to carry out the maintenance. Moreover, in a more preferred embodiment of the invention, the handheld device 168 is in real-time two way communication with analysis controller database 78. Thus, under appropriate circumstances the handheld device 168 can access such things as dealer billing systems, inventory listings, customer work order approval records, and fleet management information. Rather than having the work order include the past recent history of the asset 31 to be serviced, it is possible to use the two way communication link to request the necessary history when advantageous to do so.

Once the maintenance is completed, handheld device 168 is used to update database 78 as shown at point 170, including labor information and an identification of any parts required to effect a repair. If not already clear based on the contents of database 78, the inventory location from which any parts were pulled should also be provided. Ideally, the information is transmitted on a real-time basis from the handheld device 168. Alternatively, however, the information can be transmitted upon routine synchronization of the handheld device with database 78. It is also possible to manually enter the information into the database 78.

The maintenance information is passed to database 78 where it may be used to 5 generate maintenance tracking reports 172, and comprehensive invoices 174 listing both labor and part costs. Since the information is integrated with pre-existing asset information, no rekeying is required. Moreover, as noted above with respect to FIG. 4C, the complete maintenance history of a particular asset or class of assets may be reviewed and analyzed in detail for specific trends of interest.

In addition, when parts are used, as shown at point 176, the system preferably permits comparison of the parts used with existing inventory for the specified parts storage location. Based on maintenance trends associated with a class of assets 31 or a specific asset 31, it is possible for the system to automatically order replacement parts for an inventory location if the number of parts in a particular inventory fall below a pre-determined threshold as shown at points 178 and 180. The threshold is calculated at least in part based on an analysis of the prior maintenance of both the asset 31 and the class of assets associated with the asset. Other factors may include the age of the class of assets, the time of the year, usage trends and the like. As one example, in the winter different parts may be required as opposed to in the summer. As another example, more tires may be required for a forklift asset if a number of the assets are reaching a preventative maintenance stage where tires have to be replaced. The system terminates at point 182.

Thus, the inventive system provides a number of advantages for maintenance. For example, through the use of electronic information transmission and analysis, maintenance information is transferred and available real-time for review and for the initiation of necessary actions such as approval, the tracking of performed maintenance, the ordering of replacement parts to replenish depleted inventories, and automatic invoice generation. Since asset 31 communicates its own maintenance needs in consultation with an appropriate knowledgebase associated with database 78, human intervention is minimized. As more information is gathered over time, the scheduling of preventative maintenance can be optimized to eliminate either too little or too much maintenance. Further, the system automates a very paperintensive and time cumbersome process by permitting direct communication with the various information elements associated with an asset 31. As a result, the flow of data is more effectively controlled, dispersed, routed, monitored, and acted upon. In practice, the number of people involved in the maintenance process can often be reduced while the speed of providing maintenance can be increased. Thus, potential downtime and related performance issues can be more timely addressed.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A maintenance system involving Wthe gathering and analyzing of data relating to an asset comprising:
    a local controller located at a first location for acquiring data that is representative of an operational status of the asset;
    an analysis controller located at a second location that is responsive to said acquired data from said local controller for generating an analysis of said acquired data;
    a database of historical information representing at least prior maintenance of the asset and a class of assets associated with the asset, said analysis including comparing said acquired data to said historical information to determine if proposed maintenance is required;
    an electronic communications network connected between said local controller and said analysis controller and permitting transmission of said acquired data from said local controller to said analysis controller;
    a work order generated based on said analysis representing instructions for maintaining the asset; and
    an inventory comparison sub-system, said sub-system permitting a comparison of any part removed with existing inventory for a specific inventory location to automatically order a replacement part for the inventory location upon determining that the number of parts in a particular inventory falls below a pre-determined threshold, and wherein said threshold is actively calculated in part based on said historical information and selectively changes as said historical information changes.

2. A maintenance system as recited in claim 1, further comprising an approval process wherein a responsible party charged with paying for maintaining the asset reviews said analysis, and wherein if said responsible party denies an approval, an owning party that owns the asset reviews said analysis and selectively overrides the denial of the approval.

3. A maintenance system as recited in claim 1, wherein said work order includes asset identification information, said asset identification information comprising at least a subset of an operating characteristic, results of said analysis, operator of record, and asset location.

4. A maintenance system as recited in claim 3, wherein said work order is transmitted electronically to a handheld device, said handheld device in selective two-way communication with said database.

5. A maintenance system as recited in claim 4, wherein asset part inventory is electronically accessible to said handheld device.

6. A maintenance system as recited in claim 4, wherein said handheld device updates said historical information once maintenance of the asset is complete, and an invoice is electronically generated based on said update to said historical information.

7. A maintenance system as recited in claim 6, wherein said update of said historical information includes labor information, an identification of any part required to effect maintenance, and the inventory location from which the part was removed.

8. A maintenance system as recited in claim 1, wherein said data representing said operational status comprises at least one of a fault code, an operator checklist generated response, and an operational characteristic of the asset.

9. A method for maintaining an asset comprising the steps of:
  activating a local controller located at a first location;
  acquiring data at a first location that is representative of an operational status of the asset, which is communicated from the asset to said local controller;
  transmitting said acquired data at pre-determined intervals from said local controller to an analysis controller located at a second location using an electronic communications network connected between said local controller and said analysis controller;
  analyzing said acquired data, wherein said analysis step comprises the sub-step of comparing said acquired data to a database of historical information representing at least prior maintenance of the asset and a class of assets associated with the asset to determine if proposed maintenance is required;
  generating a work order based on said analysis representing instructions for maintaining the asset;
  carrying out said work order to maintain the asset;
  identifying any parts used in said cairyin, step;
  determining an inventory location from which said part was pulled;
  comparing an inventory level at said inventory location to a pre-determ-ined threshold; and
  automatically ordering a replacement part for said inventory location upon determining that the number of parts in a particular inventory fall below said pre-determined threshold, and wherein said threshold is actively calculated in part based on said historical information and selectively changes as said historical information changes.

10. A method as recited in claim 9, wherein said analysis step comprises the further sub-steps of:
  instituting an approval process of said proposed maintenance;
  a responsible party disapproving said proposed maintenance;
  updating said comparing step based on said disapproving; and
  creating a knowledgebase minimizing said disapproving over a class of assets corresponding to the asset using said instituting, said disapproving and updating steps.

11. A method as recited in claim 9, further comprising the steps of:
  electronically transmitting said work order to maintenance personnel;
  electronically communicating results of maintenance to provide an update of said historical information including labor information and any part required to effect maintenance; and
  electronically generating an invoice.

12. A maintenance system involving the gathering and analyzing of data relating to an asset comprising:
  a local controller located at a first location for acquiring data that is representative of an operational status of the asset;
  an analysis controller located at a second location that is responsive to said acquired data from said local controller for generating an analysis of said acquired data;
  a database of historical information representing at least prior maintenance of the asset and a class of assets associated with the asset, said analysis including comparing said acquired data to said historical information to determine if proposed maintenance is required;
  an electronic communications network connected between said local controller and said analysis controller and permitting transmission of said acquired data from said local controller to said analysis controller;
  an approval process wherein a responsible party reviews said analysis to confirm that a proposed maintenance is appropriate;
  a work order generated based on said analysis of said proposed maintenance and said approval process, representing instructions for maintaining the asset, wherein said work order is transmitted electronically to a handheld device, said handheld device providing an update to said historical information once maintenance is complete, said update including labor information and an identification of any part required to effect maintenance;
  an invoice generated based on said update to said historical information; and
  wherein said update includes the inventory location from which the part was removed and further comprising an inventory comparison sub-system, said sub-system permitting a comparison of any part removed with existing inventory for a specific inventory location to automatically order a replacement part for the inventory location upon determining that the number of parts in a particular inventory falls below a pre-determined threshold, and wherein said threshold is actively calculated in part based on said historical information and selectively changes as said historical information changes.

* * * * *